P. W. FLEISCHER.
CAN CLOSING MACHINE.
APPLICATION FILED DEC. 1, 1915.
1,429,231.
Patented Sept. 19, 1922.
13 SHEETS—SHEET 10.
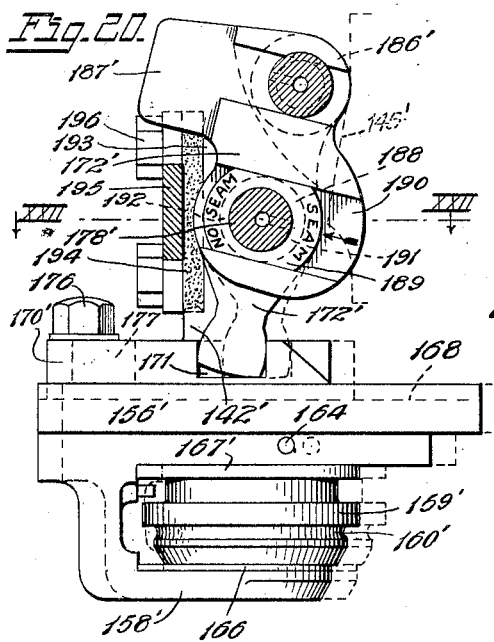
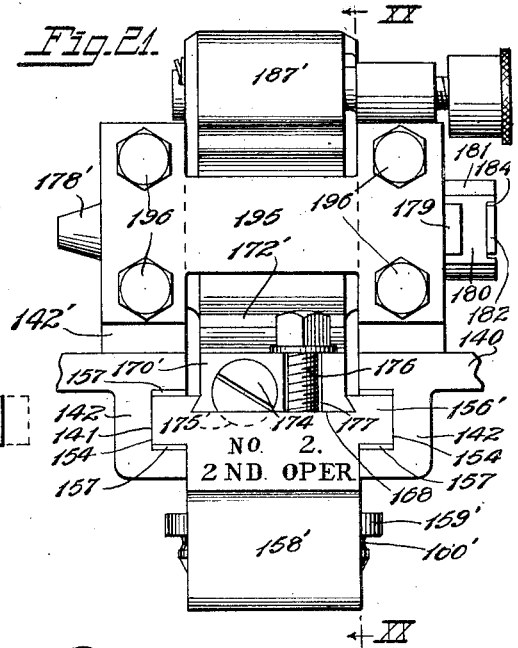
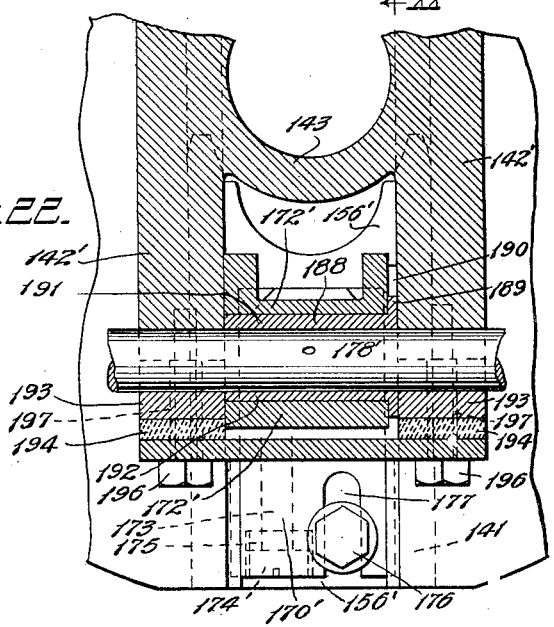
Inventor
Paul W. Fleischer
Witness
Marshall Low
By Munday, Evarts, Adcock & Clarke
Attorneys P. W. FLEISCHER.
CAN CLOSING MACHINE.
APPLICATION FILED DEC. 1, 1915.
1,429,231.
Patented Sept. 19, 1922.
13 SHEETS—SHEET 11.
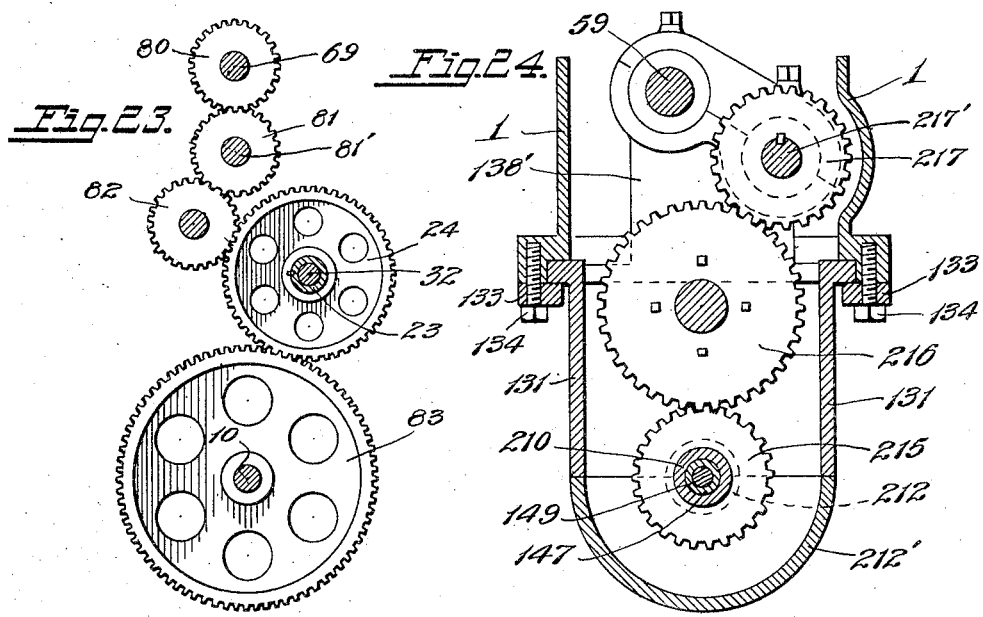
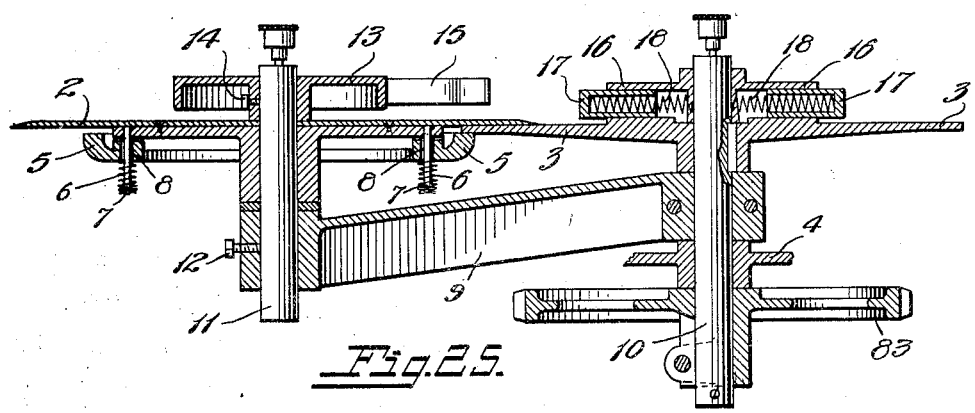
Witness
Marshall Low
Inventor
Paul W. Fleischer
By Munday, Evarts, Adcock & Clarke
Attorneys

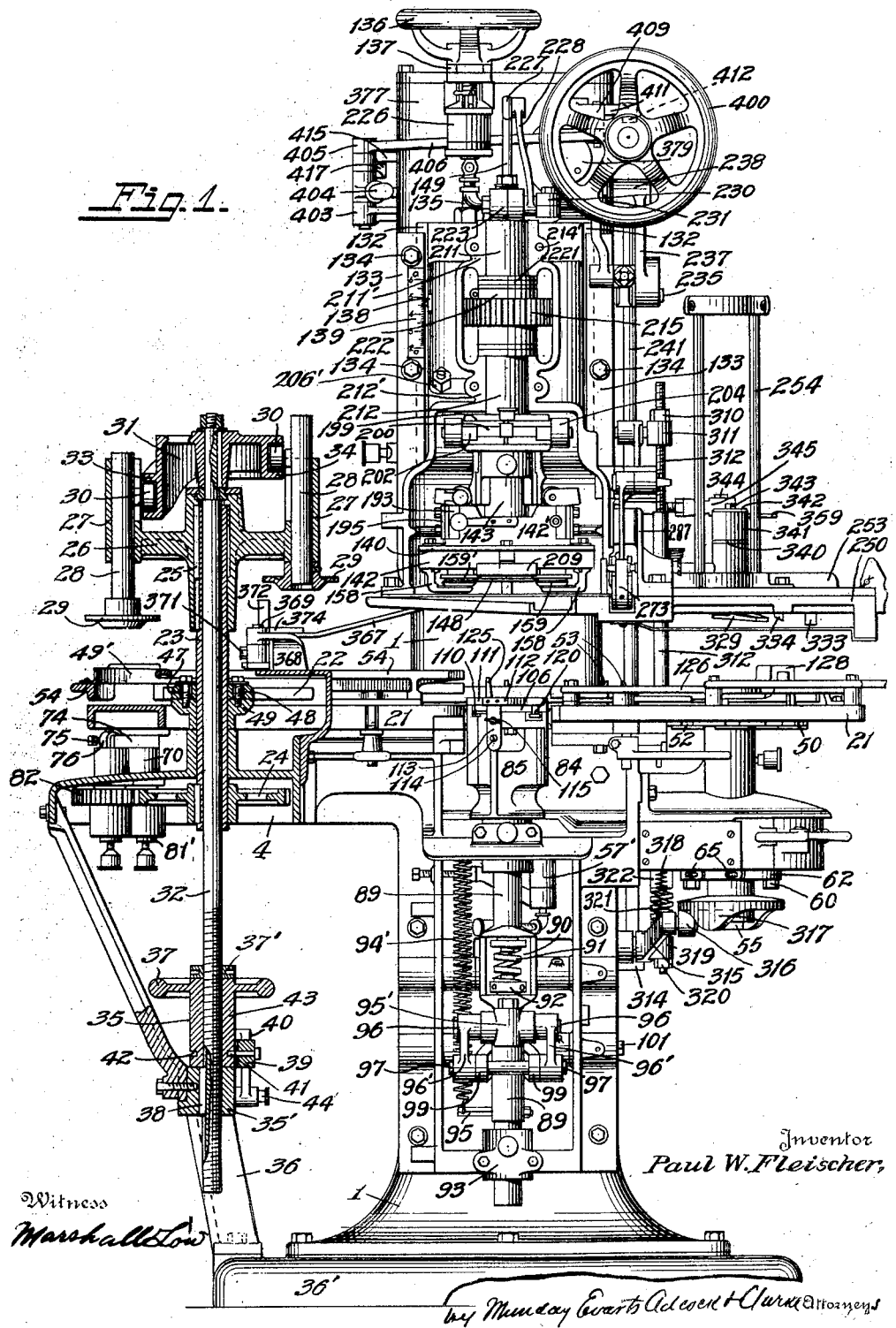

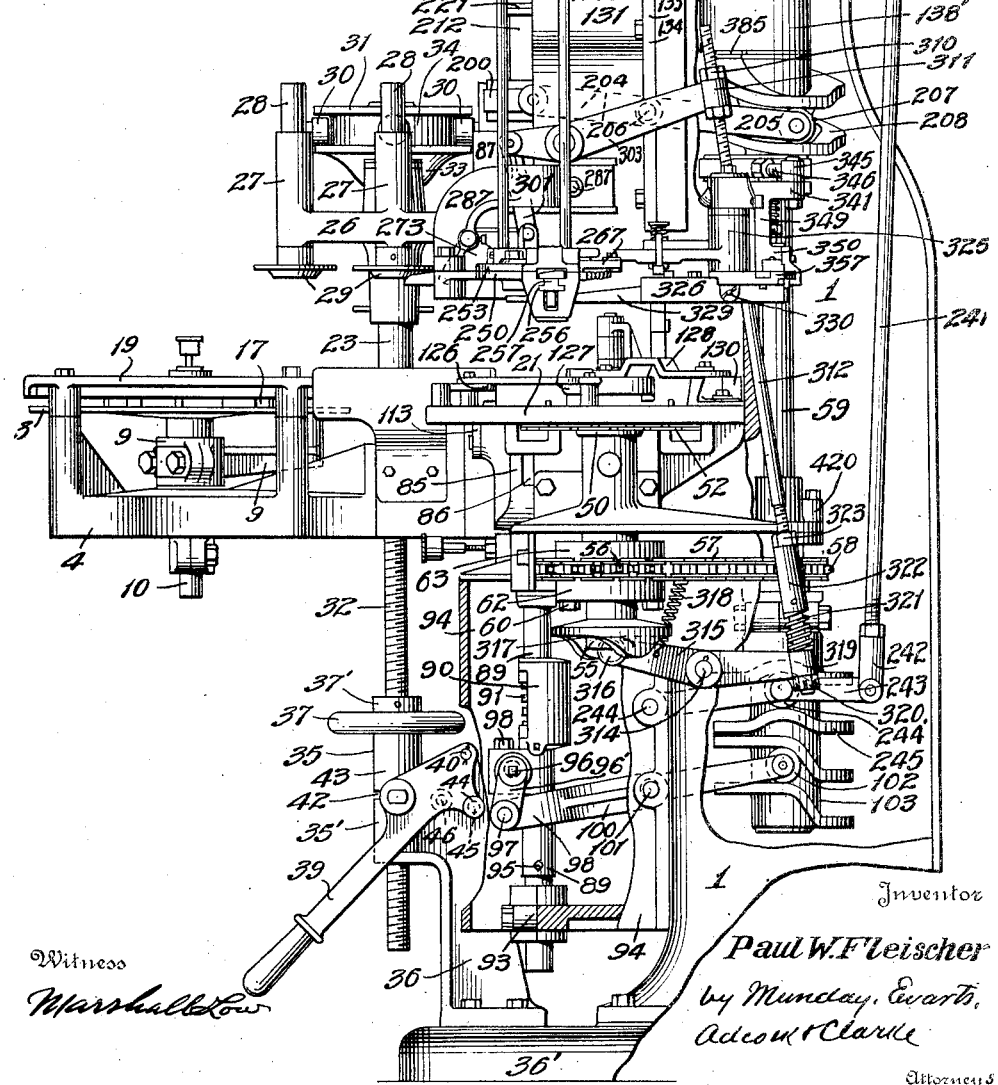

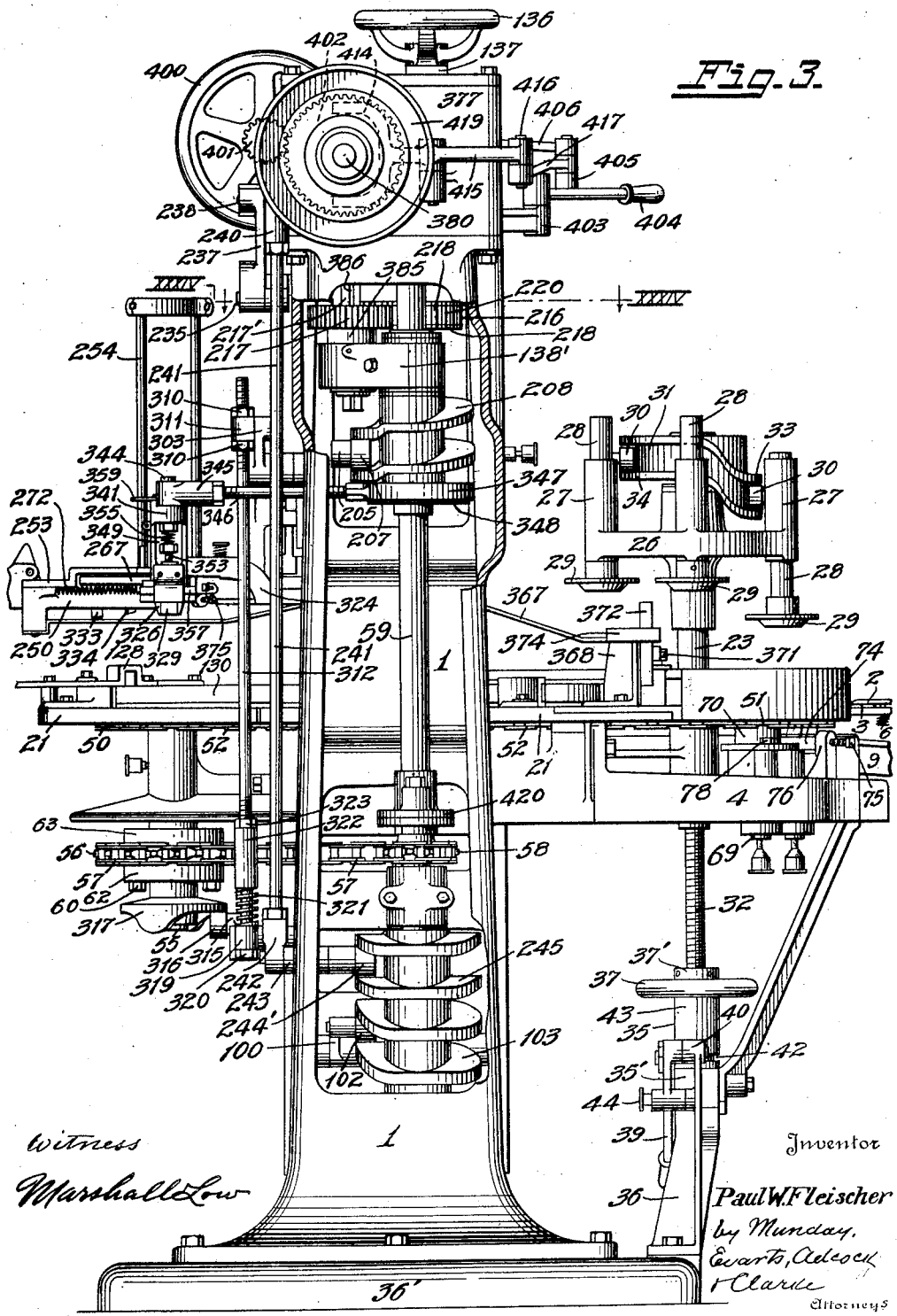

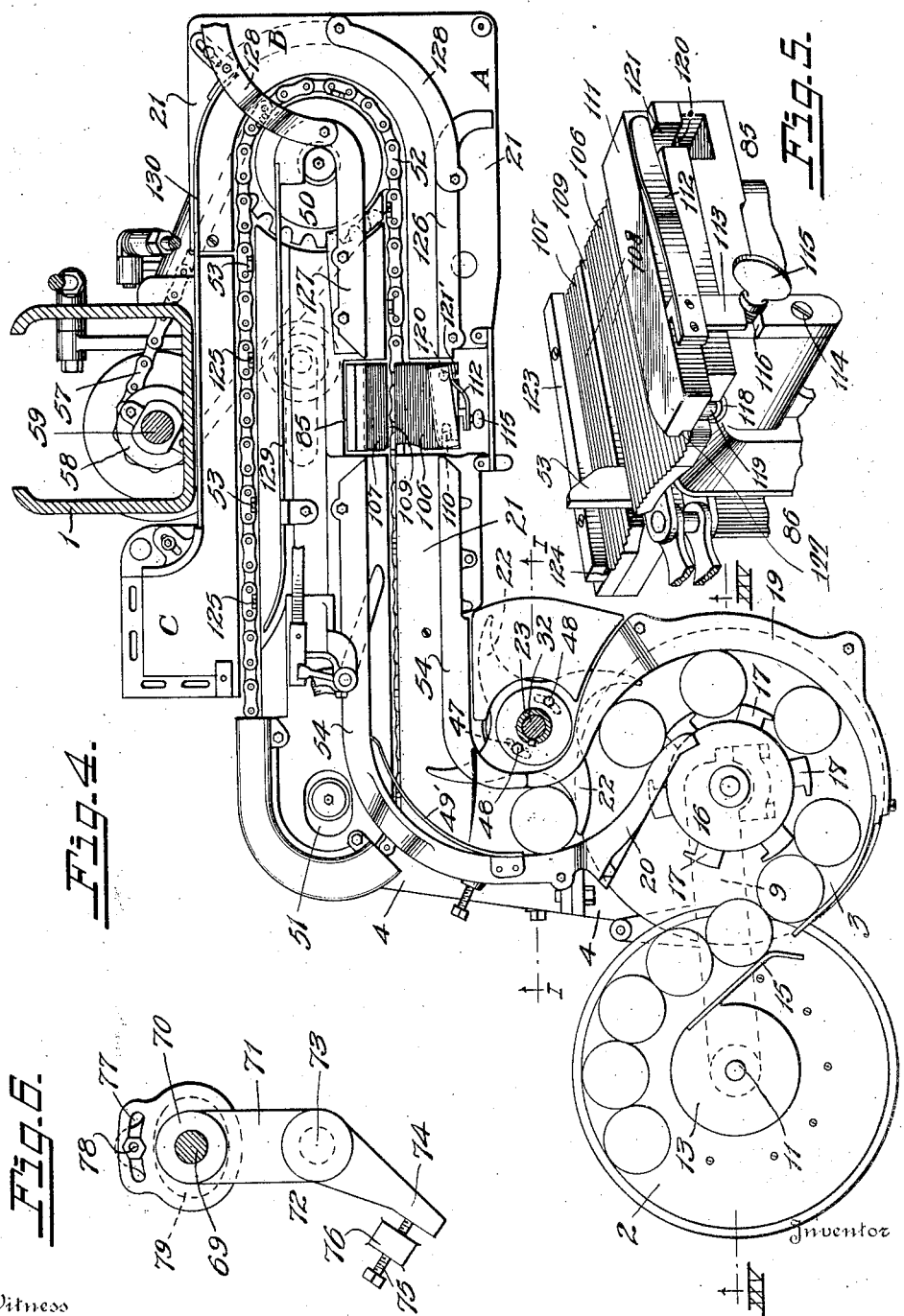

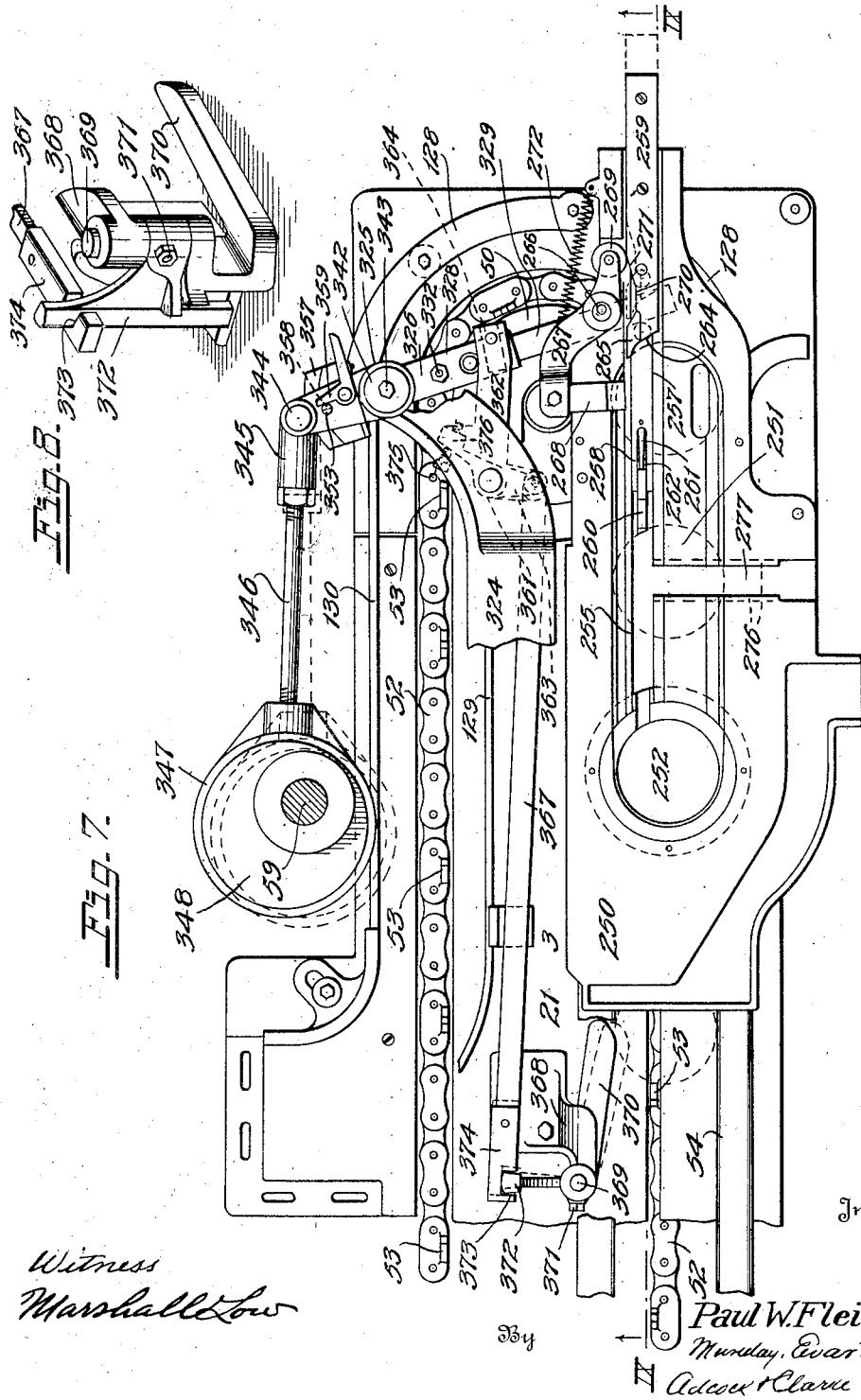

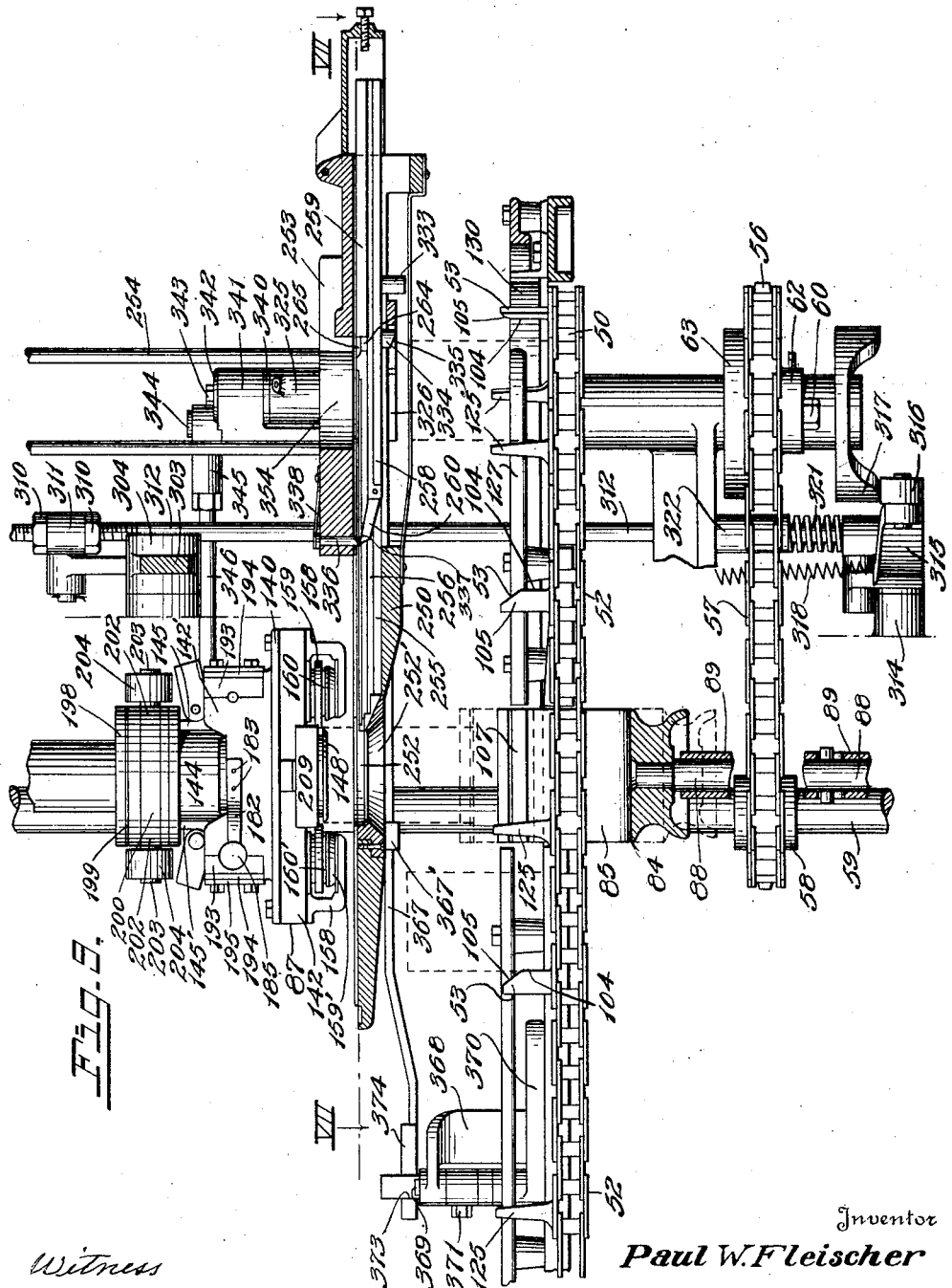

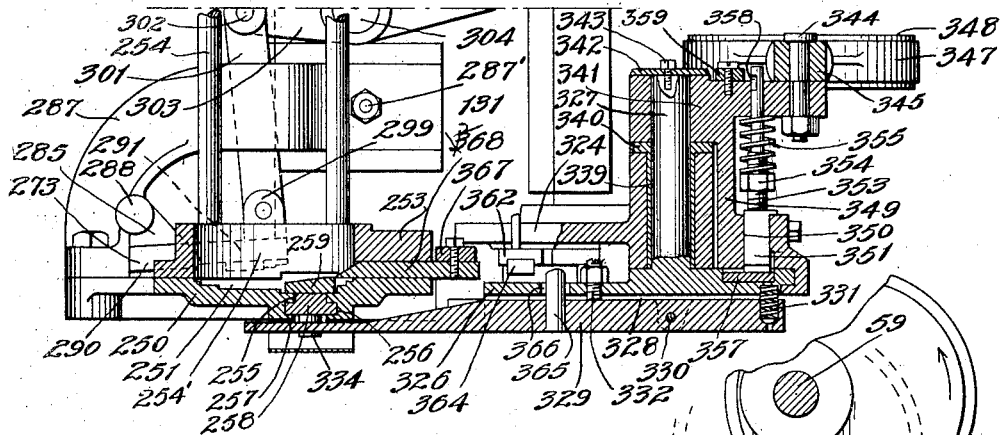
Fig.10.
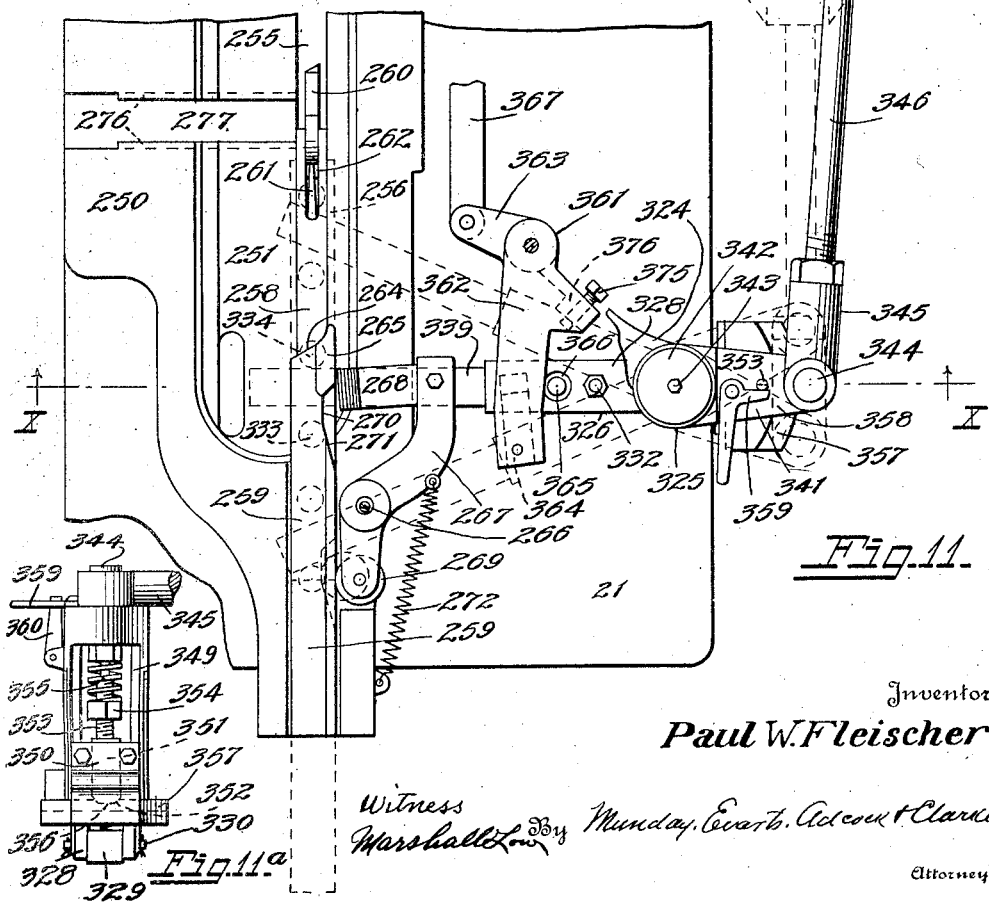
Fig.11.
Fig.11a.
Inventor
Paul W. Fleischer

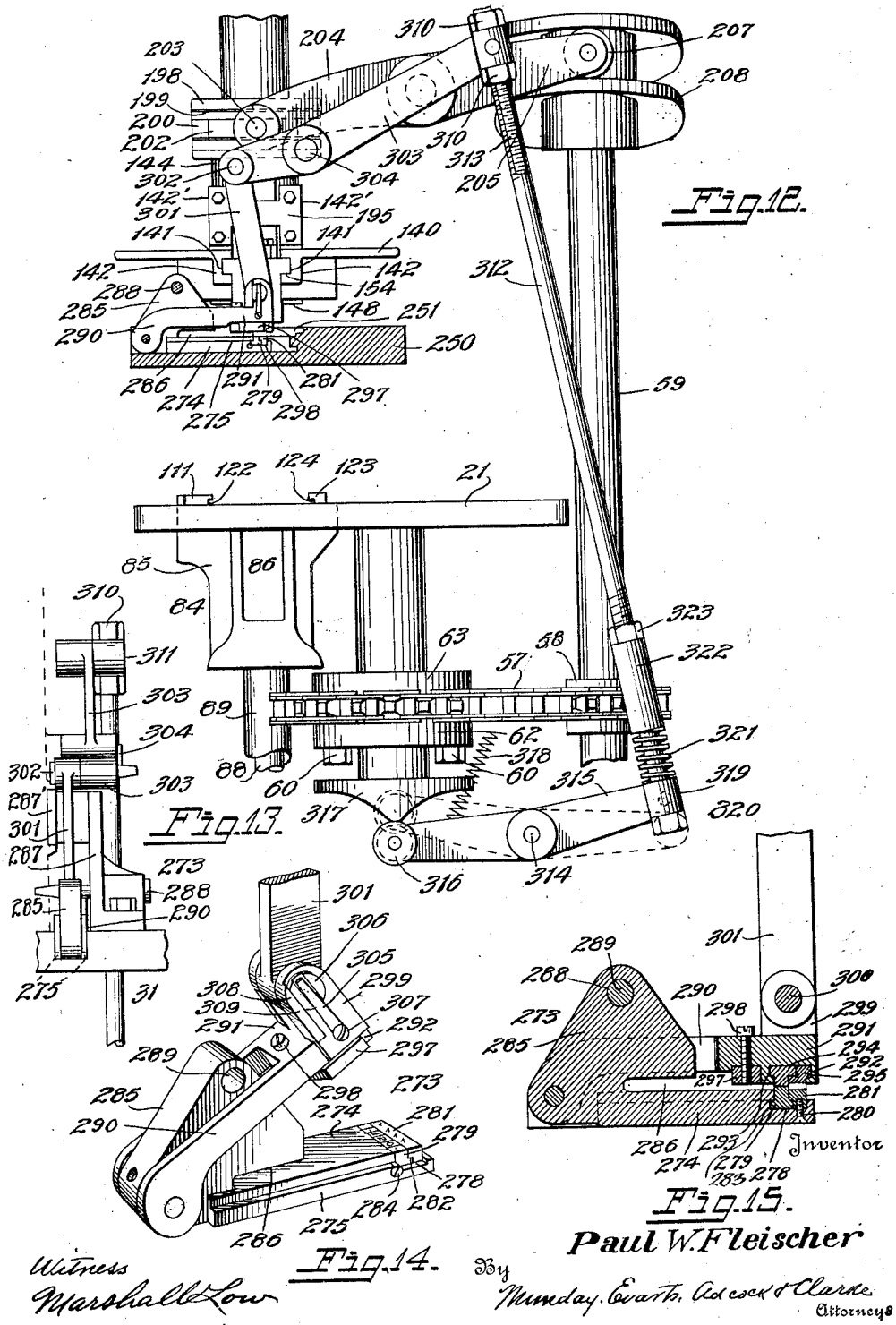

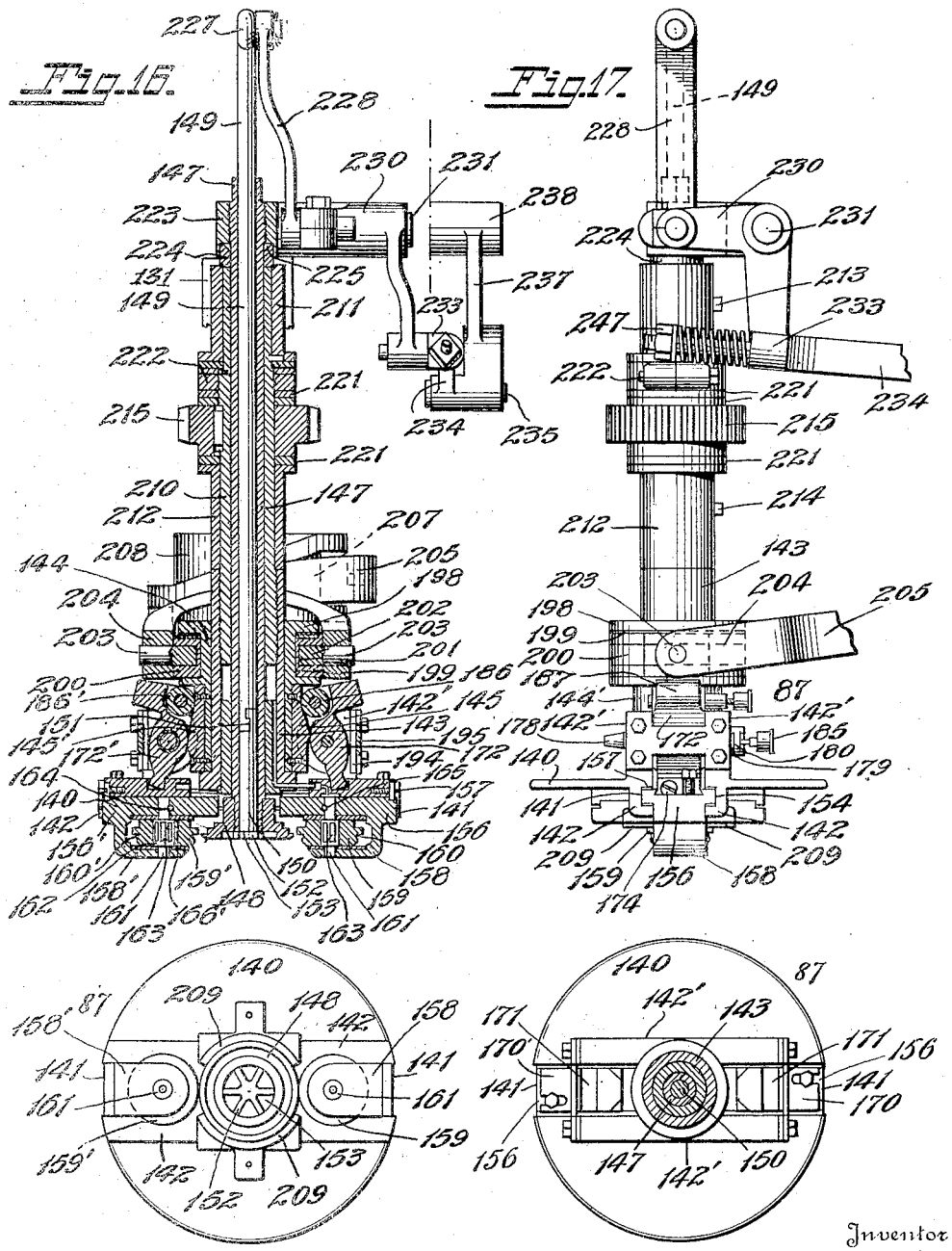

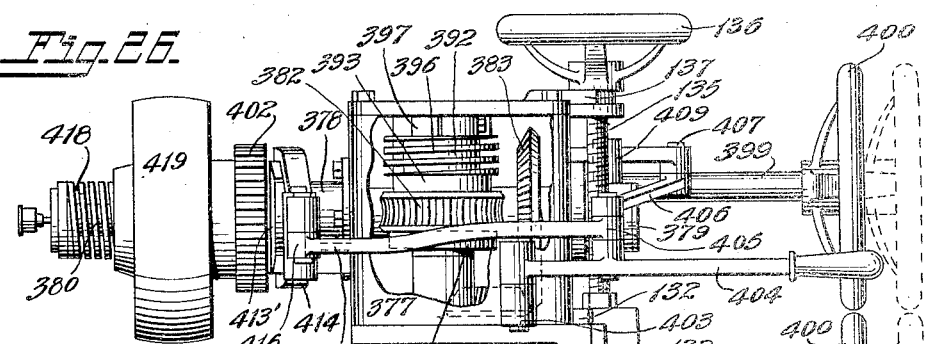
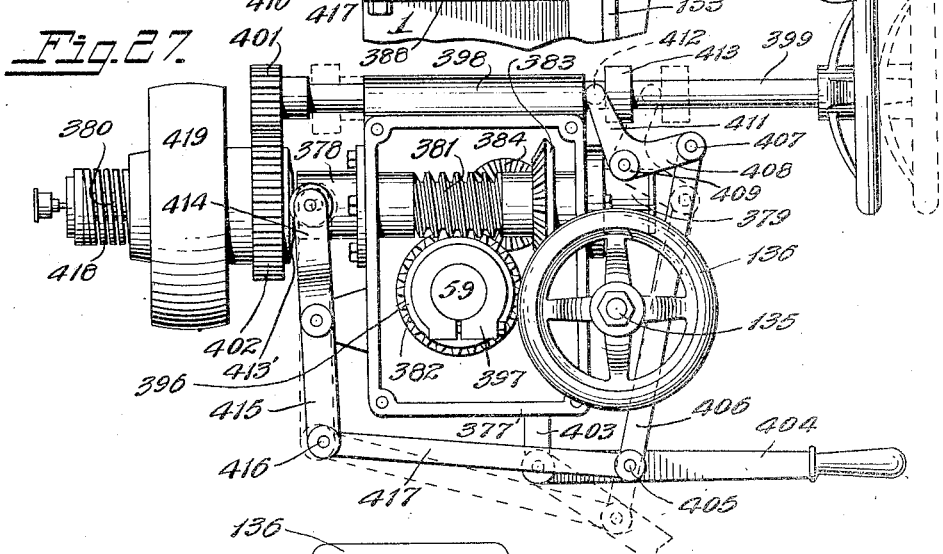
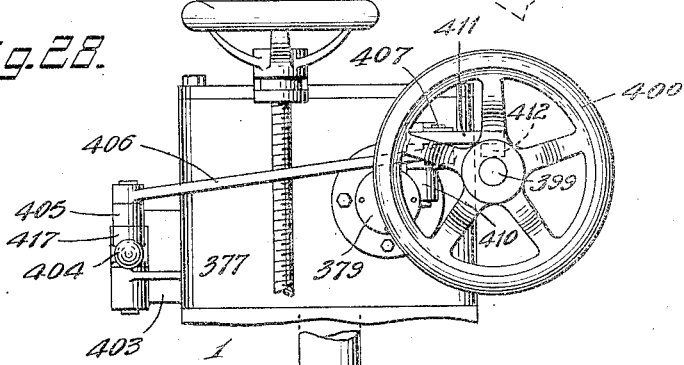
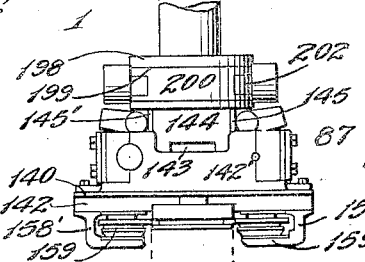

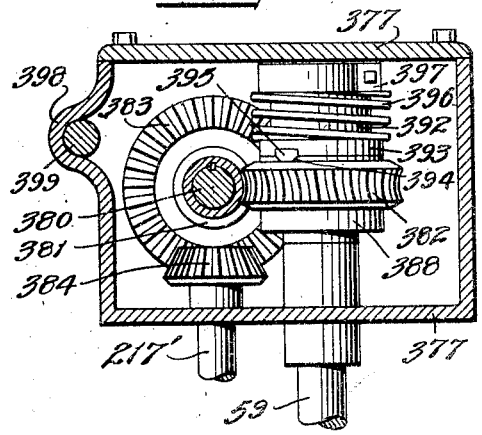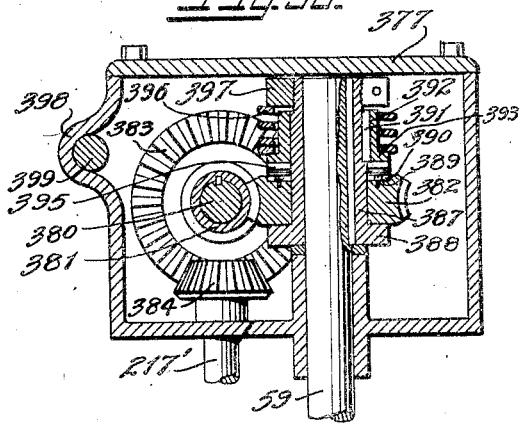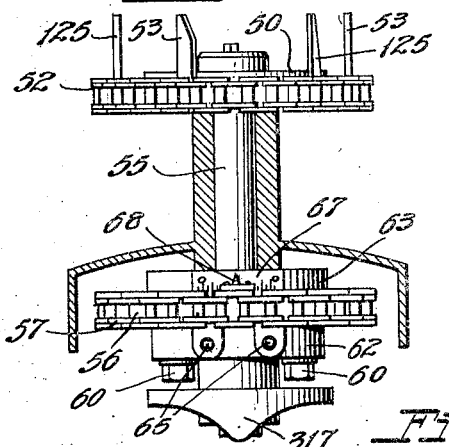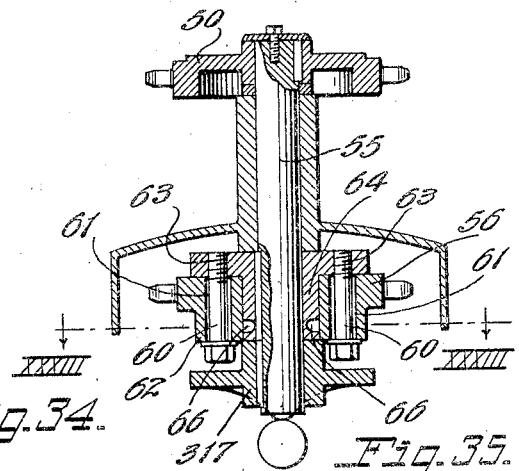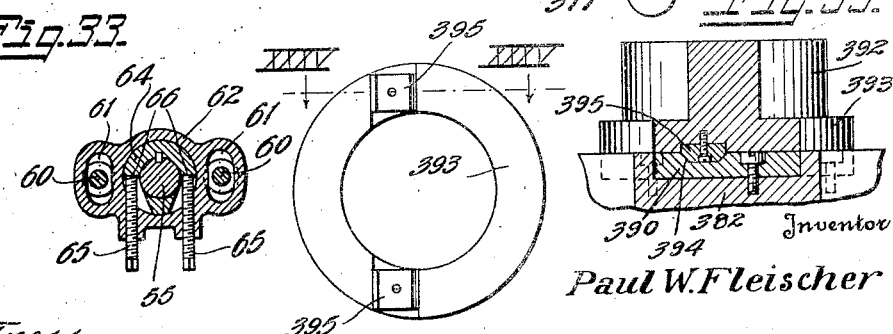

Patented Sept. 19, 1922.

1,429,231

UNITED STATES PATENT OFFICE.

PAUL W. FLEISCHER, OF NEW YORK, N. Y., ASSIGNOR TO AMERICAN CAN COMPANY, A CORPORATION OF NEW JERSEY.

CAN-CLOSING MACHINE.

Application filed December 1, 1915. Serial No. 64,494.

*To all whom it may concern:*

Be it known that I, PAUL W. FLEISCHER, a citizen of the United States, residing in New York, in the county of New York and State of New York, have invented a new and useful Improvement in Can-Closing Machines, of which the following is a specification.

The invention relates to can closing machines, comprising can conveying and feeding devices, cam end feeding devices, mechanism for centering the can and seaming thereto the automatically applied ends, can end marking devices, safety devices for preventing breakage or injury to various parts of the machine in case a can or other part should be jammed therein, and power mechanism operatively connected with the various subsidiary mechanisms for the proper and timely action of the same. The invention relates more particularly to improvements in the said mechanisms and devices and in various parts of the machine, including all matters of novelty and advantage and usefulness which are inherent in the construction hereinafter set forth.

The invention consists in the various parts and combinations thereof, hereinafter set forth and claimed.

In order to make the invention more clearly understood there is shown in the accompanying drawing means for carrying the same into practical effect, without limiting the improvements, in their useful applications, to the particular construction which, for the purpose of example, has been illustrated. In said drawings—

Fig. 1 is a front elevation, partly in vertical section, of a can closing machine embodying the invention.
Fig. 2 is an elevation of the same looking towards the right hand or delivery end of the machine, certain parts being broken away to better display the mechanism.

Fig. 2ᵃ is an elevation of the parts omitted from the right hand upper portion of Fig. 2.

Fig. 3 is a rear elevation of the same, a portion of the frame or casing being broken away.
Fig. 4 is a plan view of the same, taken above the main or feed table, certain parts being shown in horizontal section.

Fig. 5 is a perspective view of the upper portion of the can lifter or bottom plunger or chuck.

Fig. 6 is a plan view of the devices for tightening the can feed or conveying chain.

Fig. 7 is a plan view, on a larger scale of the right hand end of the main table, showing portions of the can feeding and can end feeding mechanisms.

Fig. 8 is a perspective view of the trip lever and some of the connecting parts, whereby the can is enabled to automatically control the feed of the can ends.

Fig. 9 is a vertical section on line IX—IX of Fig. 7, showing portions of the can feeding, can end feeding and seaming mechanisms.

Fig. 10 is a vertical section on line X—X of Fig. 11, illustrating more particularly the can end feeding mechanism.

Fig. 11 is a plan view of parts at the right hand end of the machine, more particularly illustrating the same mechanism, Figs. 10 and 11 being in scale about one-third of full size.

Fig. 11ᵃ is a detail in rear elevation of parts shown in Fig. 11.

Fig. 12 is an elevation, partly in section, looking from the right hand end of the machine, and illustrating more particularly the can end feeding and marking devices.

Fig. 13 is a detail elevation, looking from the front of the machine, of certain of the parts shown in Fig. 12.

Fig. 14 is a perspective view of a portion of the marking devices.

Fig. 15 is a vertical section of the same.

Fig. 16 is a vertical section of the seaming head and mechanism.

Fig. 17 is an elevation of the same, looking from the right hand end of the machine.

Fig. 18 is a bottom plan view of the seaming head.

Fig. 19 is a horizontal section on a plane just above the adjusting slide of the seaming rolls.

Fig. 20 is an elevation, partly in section, on line XX—XX of Fig. 21, on a larger scale, of a portion of the seaming head.

Fig. 21 is an elevation looking towards the left hand side of Fig. 20.

Fig. 22 is a horizontal section on line XXII—XXII of Fig. 20.

Fig. 23 is a horizontal section illustrating the transmission gearing comprised in the can feeding mechanism.

Fig. 24 is a horizontal section, on a larger scale, on line XXIV—XXIV of Fig. 3, showing the seaming head actuating gearing.

Fig. 25 is a vertical section, on a larger scale, on line XXV—XXV of Fig. 4.

Fig. 26 is an elevation of the top portion of the machine, looking from the receiving end of the same, illustrating the power mechanism and cam actuating means.

Fig. 27 is a top plan view of the same.

Fig. 28 is a front elevation of the same, showing also the seaming head.

Fig. 29 is a vertical section looking from the back of the machine, of a portion of the gear casing of the machine, showing the seaming head gearing and safety slip joint therein.

Fig. 30 is a similar view, showing in section also the vertical cam shaft.

Fig. 31 is an elevation partly in section, looking towards the delivery end of the machine, showing the feed chain adjusting means.

Fig. 32 is a vertical central section of the same.

Fig. 33 is a horizontal section on line XXXIII—XXXIII of Fig. 32.

Fig. 34 is a bottom plan view of the safety slip sleeve shown in Figs. 29 and 30.

Fig. 35 is a vertical section on line XXXV of Fig. 34.

Referring to the drawings, the main fixed framework of the machine is indicated at 1. The filled cans without tops are fed either by hand or automatically upon a rotating receiving and feed table 2. This table overlaps the margin of a second rotating table 3, which may be called the can spacing table, and which is supported by a bracket 4 of the frame 1, and frictionally drives the table 2. The frictional engagement between the two tables is effected as follows: Beneath the feed table 2 is a friction ring 5, which is supported upon a plurality of coiled springs 6. These springs are in turn supported by a corresponding number of guide pins 7 which are fixed in and project downwardly from the table 2 and loosely through apertures 8 in the friction ring 5. The friction ring 5 is thus yieldably held against the under side of the can spacing table 3 with sufficient friction so that the motion of the latter will be communicated to the feed table in an opposite direction to facilitate the transfer of cans from one table to the other.

The feed table 2 is supported and adjustable around the can spacing table 3 by a swinging arm 9 mounted upon a fixed hub surrounding the shaft 10 of the said spacing table 3. This arm 9 carries at its outer end, a stud shaft 11 which is adjustably held in the arm by a set screw 12 and upon the upper end of which the receiving table 2 may rotate. Mounted upon the upper end of the stud shaft 11 and above the receiving table is a stationary disk 13, which serves to keep the cans upon the outer margin of the receiving table 2. The disk 13 is adjustably held in place on the shaft 11 by a set screw 14 and carries an arm 15 which engages the cans as the table 2 rotates about the shaft 11 and deflects them onto the can spacing table 3 at the desired point.

Located in the center of the can spacing table 3 is a housing 16 which rotates with the said table 3, and in which are radially slidably mounted a plurality of can spacing shoes 17, which are yieldably pressed outwardly by coiled springs 18. As the cans are delivered from the receiving table 2 upon the can spacing table 3, and are carried around by the same, they are caught between the shoes 17 and a fixed arcuate guide rail 19 mounted on the bracket 4 and adjacent the outer margin of the said spacing table. If the cans so caught do not immediately register with the spaces between the shoes 17, they will be rolled along the rail 19 by the said shoes until they register with and work into such spaces. The cans will then be carried around the table 3 in spaced positions proper for successive and timed delivery to the further feeding devices.

When the cans have traveled about one half a revolution of the table 3, they engage a second deflecting guide rail 20 which projects outwardly from the main fixed table 21 of the machine and across the path of the moving cans. When the cans encounter the rail 20 their course is so deflected as to deliver them successively between the arms of a rotating star wheel 22 which delivers the cans from the can spacing table 3 on to the main table 21.

The star wheel 22 is adjustably mounted, the reason for which will be explained later, about a vertical hollow shaft 23 which projects downwardly therefrom and carries near the lower end thereof a gear wheel 24. This gear wheel is one of a train of gears by which feed tables 2 and 3 are rotated, as hereinafter set forth. Slidably mounted upon the upper end of the hollow shaft 23 by means of a feather key 25, is a topper carrier 26. This topper carrier is provided with a plurality of vertical bearings 27 corresponding in number to the arms of the star wheel 22 and each of which has mounted therein a vertically sliding plunger rod 28. The plunger rods 28 are provided at their lower ends with topping disks 29 which partly enter the cans and serve to press down their contents and displace surplus contents as they are conveyed on the table 21 beneath the topper by the star wheel 22. The plunger rods 28 are further provided, at their upper ends, with rollers 30 which engage a stationary topper cam 31 which is keyed to the upper end of a non-rotating shaft 32 mounted within the hollow shaft 23.

The high part 33 of the cam 31 is at the point where the topping of the cans is to be effected as they are carried by the star wheel 22, and the low part 34 is at the opposite side of the cam. As the topper carrier 26 rotates with the star wheel it causes the rollers 30 to travel about the stationary cam 31 and as the rollers approach the part 33 of the cam, they will cause the plunger rods 28 and the topping disks 29 to descend successively and press down upon the contents of the cans as they are conveyed beneath at the same speed by the star wheel 22. This insures that the cans shall be uniformly filled and the closing operation will not be interfered with. As the cans continue their course, under the action of the star wheel 22 the engagement by the rollers 30 with the part 34 of the cam 31 causes the plunger rods 28 and their topping disks to rise from within and out of contact with the cans.

The shaft 32 extends downwardly through the hollow shaft 23 and is adjustably supported at its lower end by an adjusting nut 35 which rests upon a bearing 35' carried by a bracket 36 secured to the base 36' of the machine frame 1. This adjusting nut has fixed thereon a hand wheel 37 by which the same may be easily operated, to regulate the topper to its proper height above the cans, according to the vertical dimension of the cans on which the machine is to operate. Threaded upon the shaft 32 and adjacent the adjusting nut 35 is a lock nut 37' which serves to secure the said adjusting nut upon the shaft 32 in its desired position. The shaft 32 is prevented from rotation but permitted to slide vertically in the bearing 35' by means of a feather key 38 (Fig. 1) secured in the latter. In order that the topping device may be thrown upward and entirely out of operative position with respect to the cans, without changing its operative adjustment, there is provided near the lower end of the shaft 32 a hand lever 39 which is pivotally mounted upon the bracket 36 as indicated at 40. This lever 39 is provided with an arcuate shoe 41 which engages a peripheral groove 42 in the hub 43 of the hand adjusting nut 35. When the lever 39 is raised it will cause the shoe 41 mounted thereon to lift the adjusting nut 35 and the vertical shaft 32, which in turn will raise the topping device as a whole away from the cans, leaving the star wheel 22 in operating position.

In order that the topping device may be securely held in either the operative or inoperative position there is provided a spring controlled pin 44 which is mounted in the lever 39 and may engage either of apertures 45, 46, as the case may be, in the bracket 36, thus positively locking the topper in its lower or upper position.

It is at times necessary to set the star wheel 22 backwards or forwards about its shaft relative to the point at which the cans are topped to accommodate cans of a greater or less diameter and to insure that the cans will be properly centered beneath the plungers of the topping mechanism. To facilitate this the hub of the star wheel 22 is provided with two diametrically opposed concentric slots 47 through which pass locking bolts 48 which are threaded into a collar 49 keyed to the hollow shaft 23. When it is desired to reset the star wheel, the bolts 48 are loosened permitting the adjustment of the said star wheel about the shaft 23. The center of a larger or smaller can is caused to be perpendicularly under the topping disk at the point of topping by the use of suitable can-guiding rails 19, 20 and 54. 49' is a spring guide forming with one of the rails 54 a yielding throat into which the cans are forced by the star wheel 22 and which holds firm and steadies the cans as they are delivered from the star wheel to the feed chain, so that they are not jarred or their contents spilled as they enter between the rails 54 and are picked up by the chain.

Mounted near the ends of the main table 21 are two sprocket wheels, a drive sprocket 50 and a driven sprocket 51, which carry a sprocket chain 52. This chain, which will be referred to as the feed chain, carries at spaced intervals, a plurality of upwardly projecting can feed fingers 53 having their can-engaging faces inclined or equivalently shaped, which engage the cans successively as they are delivered on to the table 21 by the star wheel 22 and which carry them along the table, between guide rails 54 removably fixed thereon, to the seaming station.

The drive sprocket wheel 50 is fixed on a shaft 55 which extends vertically downward and carries near the lower end thereof a driven sprocket wheel 56. This sprocket is driven by a sprocket chain 57 which extends rearwardly and around a sprocket pinion 58 on the vertical cam shaft 59 of the closing machine. The sprocket chain 57 is maintained at a proper working tension by means of an adjustable idler 57'. This idler cooperates, in adjustment, with the feed chain adjusting mechanism hereinafter described, to bring the cans to the proper points at the times when the other mechanisms, which are actuated by the cam shaft 59, operates. The sprocket wheel 56 is supported by two bolts 60 which pass through two diametrically opposed concentric slots 61 in the hub 62 of the said sprocket wheel 56 and which are screwed into a collar 63 of a sleeve 64 which is keyed to the sprocket shaft 55. Extending horizontally through the hub 62 of the sprocket wheel are two parallel adjusting screws 65 which abut two shoulders 66 in the sleeve 64. When it is desired to set the conveyor chain 52 backward or forward to accommodate cans of a larger or smaller diameter and to insure a proper delivery of the same accurately under the seaming head, it is necessary to first loosen the two binding bolts 60. The two adjusting screws 65 may then be operated. For example, suppose that it is desired that the conveyor chain 52 be set forward to accommodate cans of a smaller diameter. By first loosening the bolts 60 and then loosening the left hand screw (Fig. 33) and tightening the right hand one the sleeve 64 will thereby be rotated counter clockwise and the shaft 55 being keyed thereto, will also be turned in the same direction relative to the sprocket 56. This will cause the conveyor chain drive sprocket 50 to turn in the same direction causing the conveying limb of the chain 52 to be advanced. In adjusting the conveyor chain for cans of a larger diameter the operation is the reverse. When the conveyor chain has been moved the proper distance to accommodate cans of a different diameter, the two locking bolts 60 are tightened thereby binding the sprocket wheel 56 against the collar 63 of the sleeve 64 and causing them to again rotate as one.

In order that the exact distance that the conveyor chain 52 should be moved for adjustment may be easily ascertained, there is provided on the outer face of the collar 63 of the sleeve 64 a graduated scale 67. Secured to the hub 62 of the sprocket wheel 56 is an indicator 68 which moves across the said scale when the adjusting screws 65 are operated.

The driven feed chain sprocket wheel 51 is fixed on a shaft 69 (Fig. 6) which is journaled in a bearing 70 located at one end of an arm 71 of a chain tightening lever 72. This lever is pivotally mounted at its center, as indicated at 73, upon the bracket 4 of the machine and below the feed table 21. The other arm 74 of this lever bears against an adjusting screw 75 mounted in a lug 76 integral with the bracket 4. At the outer end of the sprocket bearing 70 is an arcuate slot 77 through which passes a cap screw 78. This cap screw is threaded into the bracket 4 and locks the sprocket wheel bearing 70 to the bracket 4 after the tension of the chain has been regulated by means of the adjusting screw 75.

The sprocket wheel shaft 69 projects downwardly through an elongated aperture 79 in the bracket 4 and has keyed thereto at its lower end a gear wheel 80. This gear wheel meshes with and drives an idler pinion 81 mounted upon a shaft or pivot 81' at the under side of the bracket 4, which pinion meshes with a second idler 82 and the latter in turn drives a larger gear wheel 24 clamped to the hollow shaft 23 that carries the star wheel 22 and the topper carrier 26.

The gear wheel 24 in turn drives a still larger gear wheel 83 clamped to the shaft 10 of the can spacing table 3. The movements of the table 3 and of the topping device heretofore described are thus effected from the feed chain by this train of gearing.

Located about midway on the table 21, and in the path of the cans as they are advanced by the feed chain is a can lifter or bottom plunger indicated as a whole at 84. The head 85 of this can lifter is slotted vertically as at 86, to permit the passage of the conveying chain 52 through the head and at the same time to allow the upward and downward movement of the head as it lifts the cans from the table to a seaming head 87. Secured to the base of the can lifting head 85 is a plunger rod 88 which is carried by a can lifter sleeve 89. Formed preferably integral with this sleeve and located about the middle thereof is a housing 90 in which is arranged a compression spring 91 which yieldably supports the plunger rod 88. This spring is supported and its tension regulated by an adjusting screw 92 threaded into the lower part of the housing 90. Below the housing 90 the sleeve 89 continues downward and is vertically slidably mounted in a bearing 93 on a casing 94 secured to the frame work 1 of the machine.

In order that the downward action of the can lifter 84 will be of a steady and cushioned character there is provided a coiled spring 94' secured at its upper end to the can lifter casing 94 and its lower end to a pin 95 fixed in the lower part of sleeve 89. Journaled on the ends of a crosspin 96 fixed in a bearing 95' on the lower part of the sleeve 89 and below the housing 90 are a pair of links 96' which extend downwardly and to which are pivoted at 97 the arms of a can lifting yoke 99 at the front end of a lever 100. This lever extends rearwardly and is pivotally mounted at its middle by means of an eccentric pivot pin 101 on the casing 94 of the machine. It is necessary that the can lifter have an accurately timed extent of movement to take the unclosed cans from and redeliver the closed cans to the feed chain, and there is provided a means of adjustment by the crosspin 96. The ends of this pin on which the links 96' are journaled are eccentric to its central portion which fits and can be turned in the bearing 95', and the height of the lifter can be regulated by turning said crosspin. The latter is held when adjusted by a tangential clamping screw 98.

The innermost end of the lever 100 is provided with a roller 102 which engages the track of a can lifter cam 103 fixed upon the vertical cam shaft 59 of the machine and which through the medium of lever 100, links 96 and sleeve 89 actuates the can lifter head 85. The cam 103 is so shaped and timed in rotation as to move the can lifter 84 upwards the instant that a can has been deposited upon the head 85 of the same by the conveyor chain 52, in line with the seaming head.

The forward and can engaging edge of the can feed fingers 53 is vertical near the base thereof as indicated at 104 and suitably inclined rearwardly at the top as at 105. The can arrives upon the lifter and the latter begins to rise before the can is quite centered on the lifter but while the can is rising the vertical part of the finger continues to advance the can to centered position, and there leaves it when the can rises to the part 105, which inclines rearwardly to compensate or partly compensate for the continued advance of the chain. This construction gives a practical length of can engaging finger for certainty of operation, and the disengagement of the can is not so abrupt as to spill any of its contents, and its rate of advance is gradually diminished as it nears and arrives at the point where it is to stop on the lifter.

The top surface of the can lifter head 85 is provided with two lifter plates 106 and 107 having longitudinally knurled surfaces 108 (Fig. 5). These plates overhang the conveyer chain slot 86 in the said head 85 leaving a space 109 between them wide enough to permit the passage of the fingers of the feed chain 52 through the same. The knurled surfaces 108 of these plates tend to prevent any twisting or rotary motion of the can body upon the can lifter head 85 while the can is being operated on by the rotary seaming head. The lifter head is provided with means for gradually, or without abruptness causing the can to come to rest on said head as it is lifted away from the finger 53. One suitable means for this purpose is the following: Pivotally mounted at one end as indicated by a pin 110 upon the forward edge of the front lifter plate 106 is a guide bar 111. This bar is yieldingly held in an inward position towards the can by a leaf spring 112 secured to an arm 113 pivoted to the front of the lifter head 85 as at 114. The arm 113 and its spring 112 are normally held fast in an engaged position with the guide bar 111 by a cap screw 115 which passes through a slot 116 in the arm 113 and is threaded into the lifter head 85. The pivot of the guide bar 111 consists in a downwardly projecting pin 110 which terminates in a head 118. This pin engages a slot 119 in the knurled base plate 106 and is prevented from upward displacement by the head 118 engaging the under side of the said plate. The outer and swinging end of the guide bar 111 is also prevented from any upward movement by a similar headed pin 120 which travels in an arcuate slot 121 in the plate 106 concentric with the pivot of the guide bar. It will be apparent that the guide bar 111 may be removed by simply loosening the cap screw 115, allowing the arm 113 and spring 112 to swing downward and out of engagement with the pivoted guide bar 111. The guide bar may then be swung forward disengaging the pin 120 from the arcuate slot 121, permitting the bar 111 and pivot pin 110 to be disengaged from the pivot slot 119. The inner wall of the guide bar 111 is under cut as at 122 so as to engage the lower flange or seam of a can to prevent any upward movement of the can relative to the can lifter 84. Rigidly secured to the rear of the head 85 is a second fixed guide bar 123 having a similar under cut recess 124 which coacts with the recess 122 in holding the can down on the plates 106, 107. As the can is carried onto the can lifter 84 by the conveyer chain 52, it forces the pivoted guide bar 111 outwardly against the pressure of the spring 112 and is thus held firmly, although not too tightly, upon the can lifter head 85, and gradually brought to rest by frictional resistance without an abrupt stop. The can lifter head having previously commenced to rise, raises the can through a centering device to the seaming head, receiving in such movement an automatically fed can end which is seamed in place by the seaming head, which will be later described.

The can now being closed the can lifter 84 descends lowering the closed can from the seaming head again to the main feed table 21. As the can lifter is descending, but before the same has completed its stroke, the can is again engaged by a longer can extracting finger 125 fixed on the conveyor chain 52, and which projects upwardly through the space 109 between the base plates 106 and 107 and conveys the closed can off the lifter head and along the track to the delivering point on the table 21. These extracting fingers 125 are comparatively straight and are located upon the conveyor chain 52 in the spaces between the curved can feeding fingers 53. It will be noticed that the cans are so spaced, and their movement so timed before they are delivered onto the main feed table 21, that they are caught only by the conveying fingers 53, allowing the can extracting fingers 125 to pass the receiving point without having a can delivered before them. A can having been carried onto the lifter 84 by the conveying fingers 53 is raised, seamed and lowered in time to be caught by the extracting finger immediately succeeding the conveying finger that delivered the can to the seaming station. By this arrangement there is always a space awaiting to receive a seamed can and the operation of the machine is very rapid.

The filled cans having been seamed and closed and returned to the main table 21 are conveyed along the table by the extracting fingers 125 between guide rails 126 and 127 to the point where they are desired to be delivered. There are several such points on the table where the closed cans may be so delivered. These points may be determined by the arrangement of the guide extensions or can-switching rails 128. They may be conveyed along the table and delivered at the front of the machine at a point indicated by the letter A or they may be delivered at the end of the table at B. It is still possible that the location of the machine will make it desirable to have the cans continue around the table between the guide rails 129 and 130 and be delivered from the machine at the rear of the same at the point indicated at C. These various deliveries are effected to obtain the most convenient and rapid working organization of the machinery of the plant, by swinging around and refastening the switch extensions 128, as indicated in dotted lines in Fig. 4. To adjust the machine for operating on another size (diameter) of cans the changes include preferably the removal of the rails 19, 20, 54, 126, 127 and switch extensions 128, substituting other rails and extensions which are or may be secured at the same points but which are shaped to change the width of the channels in which the cans are moved and guided.

The frame 1 of the machine, extends upwardly and has vertically slidably mounted upon the front face thereof a seaming head casing 131. This casing overhangs the table 21 and is provided with vertical flanges 132 adjacent the frame 1 which are retained against the same by vertical guide members 133 adjustably secured to the frame 1 by lock bolts 134, which normally bind the casing 131 against the frame 1 and hold the same securely against vertical displacement. Secured to the top of the casing 131 is a vertical adjusting non-rotary shaft 135 which extends upwardly along the face of the frame 1 and is supported at its upper end by the hub of an adjusting hand wheel 136 which is threaded onto the said shaft and rests upon a bifurcated and outwardly projecting supporting lug 137 fixed at the top of the casing 377. When it becomes necessary to raise or lower the seaming head to accommodate cans of a different size (height) the locking bolts 134 are loosened permitting the casing 131 to be raised or lowered as the case may be by the hand adjusting wheel 136 carrying with it the seaming head and its actuating gearing. The exact amount of adjustment may be read on a graduated scale 139 (Fig. 1) secured to the guide 133 at the side of the casing 131, which is traversed by an indicator 138 secured to the side of the casing 131. When the casing is adjusted to the desired height above the table 21, the locking bolts are screwed up positively locking at the side casing to the frame 1. The casing 131 is provided with a bracket 138′ preferably integral therewith, which extends rearwardly and is slidably mounted upon the cam shaft 59.

Within the casing 131 is supported a rotary two-operation seaming head indicated as a whole at 87. The seaming head consists of a body 140 in the form of a disk having a diametrical guideway 141 therein. Formed integral with the disk, and projecting below its face, are two parallel flanges 142, which form the walls of the guideway 141. The disk also has upwardly extending flanges 142′, and integral therewith a centrally located vertical hollow spindle 143, upon which is slidably mounted a sleeve 144 to which are secured two diametrically opposite first and second operation roller actuating cams 145 and 145′, which will be hereinafter described. Extending vertically within the spindle 143 is a hollow chuck spindle 147 carrying at its lower end and below the seaming head body 140 an upper chuck member 148 which cooperates with the can lifter 84 to hold the can fixed during the seaming operation. Located within the chuck spindle 147 is a vertical reciprocating knock out rod consisting of an upper section 149 and a lower section 150 connected by a scarf joint 151. The lower section 150 is provided at its lower extremity with a can engaging pad 152 which nests within a recess 153 in the chuck member 148 while a can is being seamed but which descends and assists in extracting the can from the seaming head when the seam is completed. The sections are held interlocked by the surrounding spindle 147, and by sliding the rod down to bring the joint 151 below its lower end another pad 152 may be substituted of different size or one which is damaged may be replaced.

The lower parts of the two flanges 142 are horizontally channeled as at 154 to form the slideway or track 141 for two diametrically opposed first and second seaming roll slides 156 and 156′. The upper and lower surfaces of the channels 154 are protected from wear by interchangeable linings 157 which may be replaced when worn or corroded, thus eliminating wear upon the disk itself.

Projecting downwardly from the underside of the slides 156 and 156′ are L-shaped brackets 158 and 158′ which support the first and second operation rolls 159 and 159′. The first operation roll is provided with a comparatively deep flange-turning peripheral groove 160 and the second operation roll with a comparatively shallow flange-flattening and closing groove 160′. These rolls are axially mounted and journaled upon roller pins 161 between which and the seaming rollers are located roller bearing cages 162 which retain vertical anti friction rollers 163. The roller pins 161 are held in place by tangential locking pins 164 which extend horizontally through the seaming roll slides 156 and 156' and engage recesses 165 in the roller pins, thus retaining the same in place. The brackets 158 and 158' are protected from wear occasioned by the seaming rolls by plates 166' interposed between the seaming rolls and the said brackets. Interposed between the seaming rolls and the slides 156 and 156' are hardened steel washer plates 167' (Fig. 20). These plates take practically all of the wear caused by the rolls and protect the slides and brackets which, for the object of reducing weight, are constructed of suitable metal and may be replaced when desired.

It is necessary that these rolls be susceptible to a very accurate and fine adjustment in order that perfect hermetic seams may be produced. To facilitate this, there are provided in the upper faces of the seaming roll slides, channels 168 with under cut walls adapted to receive adjusting slides 170 and 170' which are slidable radially within the said channels. These slides have in their upper surfaces, lateral notches or recesses 171 adapted to receive the lower ends of levers 172 and 172', which are actuated by the cams 145, 145' as will be described later. Threaded into the ends of the adjusting slides are horizontal adjusting screws 173 the heads 174 of which project below the lower surfaces of the adjusting slides and engage in notches 175 in the upper faces of the seaming roll slides 156 and 156', thus preventing longitudinal displacement of the adjusting slides in relation to the said seaming roll slides unless said screws be turned. Threaded into and projecting vertically from the seaming roll slides are cap screws 176 which extend through slots 177 in the adjusting slides 170 and 170' and which lock together the adjusting slides and the seaming roll slides in their desired and adjusted positions relative to each other. In adjusting the seaming rolls the adjusting slides may be considered as stationary, being held so by the cam actuated levers 172 and 172' engaging the lateral notches 171. The cap screws 176 being loosened, the horizontal adjusting screws 173 are turned, their heads 174 engaging the notches 175 in the seaming roll slides, and forcing the slides with the seaming rolls either inwardly or outwardly as the case may be until the desired seam is obtained. The set screws 176 are then tightened, locking the slides together in their adjusted positions.

Between the upper flanges 142' of the seaming disk, and substantially above the seaming roll slides, are pivotally mounted, by means of pivot pins 178 and 178', the said first and second operation cam-actuated levers 172 and 172' the lower ends of which engage the lateral recesses 171 in the adjusting slides 170 and 170'. The pivot pins 178 and 178' are prevented from rotating within their bearings by lugs 179 which engage flat surfaces 180 on the sides of the heads 181 of said pivot pins. These pins are removably held in place by leaf springs 182 which are pivotally secured to the flanges 142' at 183, the other extremities engaging notches 184 in the heads 181. The pivot pins 178 and 178' are further provided with grease cups 185 which furnish lubrication for the said levers. The upper ends of these levers carry cam rollers 186 and 186' which bear against the cams 145 and 145' carried by the sleeve 144 on the seaming head spindle 143. The upper ends of the levers are also provided with outwardly projecting solid metal weighted heads 187 and 187' which serve to some extent in counterbalancing the weight of the seaming rolls and slides when released by the cams 145 and 145' and thrown outwardly out of operative position by the centrifugal force of the revolving head, thus avoiding the danger of breakage that might otherwise result from a too sudden or violent outward movement of the seaming rolls and their slides.

The sanitary or double seaming is accomplished by two operations. The first operation is to form a curl on the end flange or on both the can end and can body flanges, leaving said flanges interlocking by a loose partly finished seam, and this is performed by the comparatively deep groove 160 in the first operation roll 159. The second operation is to complete the seam commenced by the first roll and flatten out the same and render it absolutely impervious to air, which is done by the comparatively shallow or flat annular groove 160' in the second operation roll 159'.

It is quite frequently desirable to throw the second operation roll out of operative position without disturbing its adjustment by the slide 170' in relation to the seaming head, or the equilibrium of the seaming head by bodily removing it from the head. For example, in adjusting the first operation roll to make a correct first seam, it is imperative that the first seam formed should not be touched by the second operation roll so as to flatten or otherwise change its shape, until, by experiment, the partial seam has been made satisfactory. Again it is often necessary in canning certain food stuffs that the first loose seam should be formed, and before the seam is rendered air tight by the action of the second operation roll, to remove the can from the closing machine to an exhaust box where the can and contents are heated for the necessary length of time under a suitable temperature, in order that certain gases liable to cause swell or spring heads of the cans be exhausted through the comparative loose first seam, and to then return the can to the closing machine for the second and finishing seaming operation. The means for thus throwing the second operation roll out of engagement with the can without removing the same from the seaming head is as follows: Mounted within the second operation lever 172' and about its pivot pin 178' is an eccentric bushing 188 having a substantially rectangular head 189 which nests within a corresponding recess 190 in the side of the lever 172'. The bushing 188 is thus held against rotation in its desired position, and with its head 189 flush with the side of the lever, and against lateral displacement between the walls or flanges 142' which form the bearings for the lever pivots.

In operative position the thick part 191 of the bushing 188 is towards the center of the head and the thin part 192 turned outwardly. To disengage the second operation roll 159' as mentioned, the pivot pin 178' is removed and the lever 172 lifted out. The bushing 188 is then given one half turn bringing the thin part 192 of the same towards the center of the seaming head and the thick part 191 opposite. The lever is then replaced and the pivot pin inserted. In replacing the lever and its pivot and at the same time engaging the lower end of the lever with the notch 171, the slide 156' has to be moved a little outward from its former position. The second operation roll is now out of operation and the head is adapted to make a first seam only. In order that no mistake may be made as to how the bushing 188 should be turned, either to seam or not to seam, the head of the same on the sides adjacent the thick part 191 and thin part 192 are stamped "Seam" and "No seam" respectively, and the side of the lever is stamped with an arrow shown in the drawings (Fig. 20). By thus giving the bushing one half revolution thereby moving the thick part of the same outwards, in relation to the seaming head, and the pivot pin 178' being considered as stationary, the pivotal center of the lever has been moved outwardly or further away from the center of the seaming head. This being the case, when the cam 145', on the vertically sliding sleeve 144, actuates the upper end of the lever 172', causing the same to oscillate about its pivot 178', the innermost limit of the arc described by the lower end of the said lever is further away from the center of the head, and the roll 159' will not move as far inwardly as it did before the eccentric bushing 188 was given its half turn, and cannot operate on the can or can end flanges.

As the head and rolls are revolving about a can and chuck in its seaming operation, which it does a number of times to a can, the seaming rolls pass over the side seam of the can body, causing a slight jar or vibration. To reduce this additional wear upon the rolls and to insure a perfect seam free from wrinkles and leaks, there are provided back of the lever pivot pins 178 and 178', and forming the outer halves of their supporting bearings, metal blocks 193. Each of these blocks is cushioned at its back by a block 194 of some fibrous or other suitable resilient material which absorbs the vibration so caused by the side seam. These cushion blocks 194 and bearing blocks 193 are held against displacement by horizontal I-shaped cross plates 195 through which pass bolts 196 which are threaded into the main casting of the seaming head, but which pass through apertures 197 of a larger diameter in the fiber blocks and metal bearing blocks, allowing the same to give outwards slightly when the rolls pass over the said side seam.

At the upper part of the cam carrying rotary sleeve 144 and integral therewith is an annular collar 198 provided with a peripheral groove 199 which carries a split non-rotary ring 200. This ring is provided with horizontal diametrically opposed channels 201 adapted to receive two sliding shoes 202. These shoes are provided with trunnions 203 which are pivoted to the arms of a yoke 204 on one end of a seaming roll actuating lever 205. The lever 205 is pivotally mounted at its center upon the casing 131 by means of an eccentric pivot pin 206, by which a very fine vertical adjustment of the sleeve 144 may be had. The pivot 206 is held from turning by a transversely grooved tangential clamping bolt 206'. The inner extremity of the lever 205 is provided with a roller 207 which engages a grooved cam 208 slidably mounted on and rotated by the vertical cam shaft 59 of the machine. It will be seen that as the cam rotates, the lever 205 will oscillate vertically causing the rotary cam carrying sleeve 144 to reciprocate upon the spindle 143 of the seaming head body while the same is revolving, and causes the first and second operation cams 145 and 145' to successively actuate the seaming roll levers, slides and rolls. The high part of the first operation cam 145 is located higher up on the sleeve than the high part of the second operation cam 145'. This is because the seaming operation takes place while the cam sleeve 144 is traveling upwardly, and the high part of the first operation cam 145 must actuate the first operation lever, slide and roll before the high part of the second operation cam 145' actuates the lever slide and roll for the second operation. After the seaming operation is completed and the lever 205 has depressed the cams the centrifugal force generated by the fast rotation of the seaming head will cause the rolls to disengage themselves from the can and slide outwardly together with their slides and levers back to normal position and ready for another operation.

In order to prevent the seaming rolls 159 and 159' from wearing down the taper of the chuck 148 during the time that no can is in seaming position, there is allowed one sixty-fourth of an inch vertical play, or other suitable distance, between the chuck spindle 147 and its supporting means. This will allow the chuck 148 to drop enough to clear the seaming rolls when there is no can and can end in position, but when a can and top is raised into the seaming head by the can lifter 84, the said can top engages the chuck and will raise the same to its seaming position, thereby taking up the small space (or portion thereof) shown in Fig. 16 at the top of the chuck, to coact with the seaming rolls in making the seam. Secured to the under side of the seaming head body 140 and adjacent the chuck 148 are two arcuate guard members 209. These guards engage the top of the can when the same is in the seaming head and limit the upward movement of the can and prevent the upper flange of the same being seamed over the upper edge of the chuck 148.

Threaded into the seaming head spindle 143 is a vertical sleeve or hollow shaft 210 which is supported within the casing 131 by upper and lower bronze pin bushings 211 and 212 (Figs. 1, 16 and 17) the pins 213 and 214 of which project into apertures adapted to receive them, in the rear part of the casing 131, thus holding the said bushings against rotation. The front portion of the casing comprises upper and lower bearing caps 211', 212' corresponding with and embracing the front sides of the bushings and holding them in place, said caps being bolted to the rear part of the casing at 214'. Keyed to the shaft 210 is a spur pinion 215 which meshes with and is driven by an intermediate drive gear 216 (Fig. 24) mounted in the casing 131, and which is in turn driven by a gear wheel 217 mounted slidably upon a vertical shaft 217' and supported upon the outer end of the bracket 138'. The intermediate drive gear 216 is preferably formed of two plates 218, secured between which by means of bolts 219 is a block of fabroid 220. This construction eliminates to great extent the noise and jar caused by the fast rotation of the gearing. Located above and beneath the spur gear 215 are floating bronze washers 221 the play of which is regulated by means of an adjusting nut 222 threaded onto the upper part of the hollow shaft 210. The chuck spindle 147 projects above the casing 131 and is supported by a lock nut 223 which bears upon the upper surface of the said casing. Interposed between the nut 223 and the shaft 210 is an oiling washer 224 having an upper countersunk surface 225. The lock nut 223 is provided with an oil cup 226 which feeds oil into the said beveled or countersunk surface 225 and from thence down the chuck spindle to the chuck and seaming slides and rolls.

The upper section 149 of the knock out rod extends vertically upwards through the chuck spindle 147 and terminates in an eye 227 to which is pivotally connected the upper end of a link 228. The lower end of this link is pivoted to one arm of a bell crank lever 230 which is pivotally mounted upon the casing 131 as indicated at 231. The other arm of the bell crank lever is provided with a swivel connection 233 which slidably supports one end of a link 234. This link is pivoted as at 235 to an arm of a second bell crank lever 237 which is pivoted at 238 to the casing 377 of the machine. An arm of the bell crank 237 extends rearwardly and is pivotally connected by means of a knock out rod connection 240 with a vertical rod or link 241. This rod extends downwardly and is again pivotally connected by means of a lower member 242 with a cam actuated lever 243 which is pivoted at its inner end at 244 upon the casing 94. Located approximately at the middle of the lever 243 is a cam engaging roller 244' which engages a grooved cam 245 mounted upon the vertical cam shaft 59. In order that the action of the knock out rod upon the cam be of a yielding or cushioned character there is provided a compression spring 246 which encircles the end of the link 234 projecting forward out of the swivel connection 233. This spring is held against the swivel connection 233, and its tension regulated, by a nut 247 threaded onto the outermost extremity of the link 234. It will thus be apparent that as the cam 245 rotates it will transmit a vertical reciprocating and cushioned movement to the knock-out rod. The surface of the cam 245 is so formed as to cause a double movement of the knockout rod. When a can end is fed into the centering device, by a mechanism presently to be described, the knock out rod descends and engages the same, thus positively preventing its displacement as the can body rises beneath it. When the can body engages the can end and the latter is properly centered upon the can the knockout rod ascends with the can and can end into the seaming head. The can and can end are thus held between the lower can lifter 84 and the said knockout rod while the can end is being seamed on by the seaming head. When the seaming operation is completed the closed can is lowered from the seaming head by the can lifter 84, and to insure that the can does not stick within the seaming head the knockout rod descends and positively ejects the same from the head.

It is seen that the knockout thus has two downward movements for each can seamed. In changing the height of the seaming head casing 131 as described beyond certain limits the changing of the pivot points on the arms of the bell crank lever 237 is necessitated to accommodate an extreme change in height. To allow for this, extra pivot holes 248 and 249 are provided in the lever arms (Fig. 2) which holes are located nearer to the pivoted point 238 of the same. As illustrated in the drawings the parts are arranged as when the casing and seaming head have been adjusted to accommodate cans from two inches to four inches in height. The holes 248 and 249 are used only when the casing and seaming head are adjusted for cans of from four inches to six inches in height.

*Can end feeding mechanism.*—Secured at one end to the under side of the seaming head casing 131 and extending outwardly therefrom and overhanging the main conveying table 21 of the machine, is a can end feed bracket 250. This bracket has a channel or track 251 machined in its upper face which corresponds in shape in cross section to the cross section of a can end so that the top surface of a can end being conveyed along the said track will be flush with the surface of the bracket 250. The track 251 extends inwardly and terminates in a circular aperture 252 in the bracket 250 axially beneath the seaming head 88 and over the can lifter 84. The can end is deposited over this aperture by a feeding mechanism presently to be described, and there awaits the can body as it rises under the action of the can lifter 84, being of a larger diameter before seaming than the said aperture. Said aperture forms a centering device for the can as it is elevated to the seaming head, being flared or beveled at the under side of the bracket, as shown at 252' (Fig. 9). Secured to the bracket 250 and above the track 251 is a casing or cover 253, which forms the support for a can end stack holder 254, the latter being located above the outermost end of the track or channel 251. The casing 253, beneath the can end holder 254, has a circular aperture 254' therein to permit the can ends to descend vertically from the holder 254 to the track 251 and into position to have the lowermost one separated from the stack and conveyed along the said track to the marking device, which will be described later. In the bracket 250 and substantially in the center of the track 251 is a longitudinal slot or passage way 255 which extends down through the bracket and the sides of which are horizontally recessed as at 256 and form the supporting and guiding means for a reciprocating slide 257, the sides of which are so shaped as to engage within the horizontal recesses 256. The slide 257 is preferably formed in two parts, a lower and longer finger bar 258 and an upper and shorter carrier bar 259. Pivoted to the inner extremity of the finger bar 258 is a can end engaging finger 260 which extends upwardly above the surface of the track 251 and in the path of the can ends. This finger is normally held in its upward and engaging position by a leaf spring 261 which bears against an outwardly projecting lug 262 on the finger 260. The inner and can end engaging shoulder 264 of the carrier bar is provided with a steel fin 265 which extends inwardly slightly and projects over the can end when the latter is engaged and may serve to separate the lowermost one of the nested can ends from the stack prior to extracting it from beneath the stack and conveying it to the marking device.

Mounted upon the bracket 250 upon an eccentric adjusting pivot 266 and located at one side of the passageway 255, is a lever 267 one end of which carries a can end separating knife 268 while the other end thereof carries a roller 269 which bears against the edge of the carrier bar 259, and coacts with a recess 270, in the form of a cam or inclined surface 271, in the latter. The roller 269 is yieldably held against the side of the carrier bar 259 by a spring 272, one end of which is attached to the inner end of the lever 267 and the other end thereof secured to the bracket 250. It will be seen that when the slide 257 is moved to its outermost position the roller 269 under the action of the spring 272 will engage in the recess 270 in the carrier bar 259, allowing the separating knife 268 to move laterally from beneath the stack of nested can ends and permitting the same to descend and rest upon the track 251. When, however, the slide 257 commences to move inwardly along its guideway, the cam surface 271 will engage the roller 269 and force the same out of the recess 270 until it bears against the straight side of the carrier bar 259. This outward movement of the roller 269 overcomes the spring 272 and turns the lever 267 about its pivot, causing the separating knife 268 to enter between the edges of the can ends in the stack and above the bottom one, cutting out the latter from its nested position and at the same time lifting the remainder of the stack and supporting the same clear of the carrier bar 259 as it conveys a single can end so separated along the track to the marking device. Located in the bracket 250 and at a point midway between the can end feeding and seaming stations, and extending at right angles to the track 251, is or may be a can end marking device denoted as a whole by the numeral 273. The said marking device 273 consists of a die holding base 274 preferably in the form of a slide, and having upon each side thereof flanges 275 which engage corresponding undercut recesses 276 adapted to receive them in the side walls of a slot 277 in the bracket 250. The upper face of the inner end of the base 274 is laterally recessed as at 278 to receive a series of male (or female) dies 279. Adjacent the dies 279 and secured to the base 274 by a screw 280 is a die clamping bar 281 with an undercut wall 282 which, acting with a similar undercut 283 in the opposite wall of the recess 278, prevents any upward movement of the type or dies 279. This clamping bar 281 has upon its upper face a series of signs or marks which, in connection with the dies 279, form part of the identification marks impressed upon the can ends. In order to prevent the lateral displacement of the dies 279 and to also provide means for lateral adjustment of the said dies, there are screwed into each side of the base 274 cap screws 284 the heads of which project over the ends of the dies 279 and hold them in their required position. By loosening up upon one screw and tightening up on the other the dies 279 may be shifted along the recess 278 until they register with corresponding female or male dies upon the upper die holder.

Integral with the base 274 at its outer end and projecting upwardly therefrom is a lug 285. The base of this lug is undercut as at 286 to permit the passage of can ends over the base 274 and its dies 279. Secured to the bracket 250 and extending upwardly is a bracket 287 which at its upper end fits into and is secured to the seaming head casing 131 at 287'. Passing through this bracket 287 is a pin 288 which engages an aperture 289 in the upper part of the lug 285 and serves to removably hold the marking device in its stamping position. Pivoted to the lower and outer part of the lug 285 are two inwardly extending arms 290 which constitute part of an upper die holder 291 which may be bifurcated as illustrated. On the under side of the upper die holder 291 are two downwardly projecting flanges 292 with horizontal recesses 293 on their inner faces adapted to receive a series of female (or male) dies 294 which register with the male dies 279 in the base 274. Adjacent to the dies 294 is a clamping bar 295 which registers with the lower clamping bar 281 and carries the female elements of the identification marks. In order to prevent lateral displacement of the female dies 294 and the clamping bar 295 there is provided a holder fork 297 which is removably secured by a screw 298 to the under side of the upper die holder 291. The prongs of this fork extend over the ends of the dies 294 and positively lock them in the holder. Projecting upwardly from the die holder 291 are two parallel lugs 299 between which is secured by means of a pin 300 a link 301, which is secured at its upper end by a pin 302 to one arm of a lever or rocker arm 303, which is pivotally mounted as at 304 on the seaming head casing 131. The pin 300 is removably held in position by a leaf spring 305 the upper end of which yieldably bears against the head 306 of the pin while the lower end of the said spring 305 is secured to the outside of one of the lugs 299 by a screw 307. The head 306 of the pin is flattened on one side as at 308 which rests against a projection 309 on the lug 299, thus being prevented from rotating and working the spring 305 from off the head.

The rocker arm 303 extends rearwardly and is vertically adjustably connected by lock nuts 310 and a swivel connection 311 to a marker actuating rod 312, (Fig. 12). The upper end of the said marker rod is flattened along one side and a graduated scale stamped thereon as at 313. This scale is used only when the seaming head casing 131 is raised or lowered to accommodate cans of a larger or smaller size, consequently raising or lowering the pivot 304 of the rocker arm 303.

Pivotally mounted as indicated at 314 upon the main framework 1 of the machine and below the feed table 21 is a rocker arm 315 one arm of which carries a roller 316 which engages under a revolving cam 317 mounted on the lowermost end of the vertical driving sprocket shaft 55. A coiled spring 318 serves to normally hold the said roller 316 in contact with the cam 317. The rocker arm 315 extends rearwardly and is pivotally secured to the lower extremity of the marker rod 312 by means of a lower swivel connection 319 through which the said marker rod extends and is secured by a nut 320.

Around the marker rod 312 and bearing upon the upper surface of the swivel 319 is a coiled compression spring 321 which also bears at its upper end against a sleeve 322 threaded on said rod and which is locked in position by a lock nut 323. It will be noticed that as the cam 317 revolves, it oscillates the rocker arm 315 which in turn reciprocates the marker rod 312, which oscillates the upper rocker arm 303 which, through the medium of the link 301, operates the marking device 273. It will also be noticed that the force which is applied to the marker 273 is transmitted through the medium of the coiled spring 321 and is therefore cushioned to a sufficient extent. This method is adopted in order to prevent the marring or defacing of the dies in the marker should they be out of alignment, and also to eliminate any danger of cutting or in any way puncturing the can end during the stamping operation.

Secured to the under side of the seaming head casing 131 and extending outwardly therefrom is a can end feed lever bracket 324 terminating in a vertical bearing 325. Suspended beneath this bearing is a can end feed lever 326 which is supported by a stud shaft 327 which is integral therewith and which extends upwardly and is journaled in the said bearing 325 (Fig. 10). The can end feed lever 326 is preferably of inverted channel bar form and forms a housing 328 for a can end feed lever arm 329. This arm 329 is pivoted as indicated at 330 between the flanges of the housing 328. The lever arm 329 is normally held in a raised position by a coiled spring 331 located near the inner or rear end of the lever arm. The upward movement of the outer extremity of the said lever arm 329 is regulated by a set screw 332 in the lever arm housing 328. The said lever arm 329 extends outwardly and beneath the can end feed bracket 250 and feed slide, engaging two pins 333 and 334 (Fig. 9) located on the under side of the finger bar 258 and which project downwardly therefrom upon each side of the lever arm 329. The forward pin 334 is slightly shorter than the rear pin 333 and is beveled as indicated at 335. It will be apparent that when the lever arm 329 moves forward towards the seaming station it will engage the shorter pin 334 thereby causing the slide 257 to move forward, and upon the backward movement of the said arm 329 the same will engage the longer pin 333 and cause the slide 257 to move rearwardly and into position to extract another can end from beneath the stack.

It will be apparent that as the slide 257 is reciprocated the shoulder 264 of the carrier bar 259 will extract the separated can end from beneath the stack and convey it along the track 251 to the marker 273, where it is deposited and left between the stamping dies of the same. The slide then returns and upon its next forward stroke the finger 260 of the finger bar 258 will remove the can end previously deposited in the marker and stamped, from the said marker and carry it to the centering device where it is deposited over the aperture 252 and in a position to be engaged by a can body and seamed thereon. While the finger bar 258 has been removing the stamped can end from the marker to the seaming head, the carrier bar 259 has extracted another can end from beneath the stack and deposited it in the marker where it has been stamped and is waiting to be delivered to the seaming head by the finger bar. By this method there is a constant and successive feeding of marked can ends to the seaming station without the loss of time.

In order to prevent the can end from riding backwards out of the marker, upon the carrier bar 258 on the backward stroke of the same and after the can end has once been deposited there by the said carrier bar 259, there is provided in the casing 253 and adjacent the marker 273 a pin 336. This pin projects downwardly through the casing 253 and has its lower end beveled as at 337. The upper end of the pin 336 engages a leaf spring 338 (Fig. 9) which serves to yieldably hold the said pin in its downward and can end engaging position. While a can end is conveyed into the marker by the carrier bar 259 it engages the beveled surface 337 of the pin 336 forcing the latter upward and allowing the can end to pass beneath. But upon the rearward stroke of the carrier bar the can end engages the straight edge of the pin 336 and is thus prevented from moving rearwardly out of the marker.

The wearing surfaces of the bearing 325 are protected by a tubular bushing 339 having at its upper extremity a collar 340 which forms a bearing surface for a lever latch arm 341 which is mounted upon the upper end of the stud shaft 327. The lever 326 and its shaft 327 are supported in the bearing 325 by a washer 342, which is secured by a screw 343 to the upper end of the stud shaft 327 and rests upon the latch arm 341. Pivoted to the outer end of the said latch arm 341 by a pivot pin 344 is an eccentric rod connection 345 into which is threaded an eccentric rod 346. The said eccentric rod extends across the machine and is secured to an eccentric strap 347 which passes around an eccentric 348 fixed upon the vertical cam shaft 59. Beneath the latch arm 341 and preferably integral therewith is a downwardly extending web or flange 349 which terminates in a latch housing 350. Vertically slidably mounted within the said housing 350 is a latch block 351 of hardened steel having its lower face beveled at an angle of about 45° as indicated at 352. Integral with the top of said latch 351 is a latch rod 353 which extends vertically through an aperture in the latch arm 341. Encircling the latch rod 353, and confined between the arm 341 and an adjusting nut 354 on the said latch rod is a compression spring 355 which has a tendency to normally yieldably hold the latch 351 in engagement with a recess 356 designed to receive it in a plate 357 of hardened steel secured to the lever arm 326. The upper end of the latch rod 353 is notched as at 358 to receive the edge of a latch stop 359 pivoted on the upper side of the latch arm 341. When the latch 351 is normally in engagement with the recess 356, the said notch 358 is below the surface of the latch arm 341 and out of engagement with the latch stop 359. It will be apparent that under the normal strain of operating the machine the pressure of the spring 355 will suffice to keep the latch 351 in engagement with the recess 356, and in consequence the latch arm 341 and the lever arm 329 will be oscillated as a unit by the eccentric 348. But should anything break or become clogged or jammed in the mechanism of the can end feed mechanism the unusual strain caused thereby will cause the latch 351 to be forced out of its engaging recess 356, at the same time raising the latch rod 353 enough to bring the notch 358 into alignment with the latch stop 359, which will instantly, under the pressure of a leaf spring 360, engage the said notch, preventing the latch 351 from again registering with its recess 356, from which it results that the eccentric 348 will oscillate only the latch arm 341 without operating the lever arm 329. This will continue until the obstruction in the machine is removed or the power turned off. When it is desired to again operate the machine the stop 359 is released, allowing the latch under the action of the spring 355 to return to its normal engagement with the recess 356, causing the disconnected parts to again oscillate as a unit and operating the slide 257.

Pivoted to the under side of the bracket 324 is a can end feed index lever 361 (Fig. 11) having a long arm 362 and a short arm 363 extending at substantially right angles to each other. The arm 362 extends outwardly and over the lever arm housing 328 and is provided on its under side and at its outer end with a cam 364. This cam engages a pin 365 projecting vertically from the lever arm 329 through an aperture 366 in the lever arm housing 328 and tends to normally depress the outer end of the said lever arm and hold the same out of engagement with the forward and shorter pin 334 in the finger bar 258. Secured to the arm 363 of the said index lever 361 is a connecting rod 367 which extends across the machine beneath seaming head casing 131, and which is held up in a horizontal position by a guiding support 367' attached to said casing.

Mounted upon the table 21 near the receiving end thereof and adjacent the path of the cans passing to the seaming station is a bracket 368 in which is mounted a vertical stud shaft 369, which is integral with a can-controlled trip lever 370 which rests upon the table 21 and which projects across the path of the cans beneath the can guides and which is actuated by the passing cans. Adjustably mounted by means of a clamp bolt 371 upon the stud shaft 369 and below the bracket 368 is a vertical lever arm 372 which engages a notch 373 in an arm connection 374 to which is secured the end of the connecting rod 367. It will be apparent that through this construction the lever arm 329 will normally oscillate to and fro without reciprocating the slide 257, but as soon as a can body passing along its track engages the trip lever 370, it will force the same inward (Fig. 7) thereby throwing the vertical lever 372 about its pivot, causing the arm 362 of the can lever 361, through the medium of the connecting rod 367, to be moved from its engaging position above the pin 365 in the can end feed arm 329 (Fig. 11) allowing the same to rise under the action of the coiled spring 331 to its engaging position with the short pin 334 in the finger bar 258, which can then be moved forward by the arm 329. When the arm reaches a point near the limit of its throw, the housing 328 will engage a set screw 375 mounted in a downward projecting lug 376 on the under side of the can end feed lever 361, causing the latter to be rotated about its pivot and causing the longer arm 362 thereof to again be moved back to its normal position over the path of the pin 365. Now when the can end feed lever arm 329 returns on its backward movement the pin 365 will engage under the cam 364 on the lever arm 362 causing the lever arm 329 to be depressed out of engagement with the shorter pin 334 on the finger bar 258. The arm will continue to oscillate about its pivot (supposing the feeding of cans to be interrupted) being depressed each time when it reaches a point near the limit of its backward movement. This will continue without any actuation of the can end feed slide until another can actuates the can-controlled trip lever 370 causing the arm 362 and its cam 364 to be thrown out of the path of the pin 365. It will be noticed that the lever arm 329 is not depressed low enough to prevent it from engaging the longer pin 333 on the finger bar 258, which pin is only encountered by the lever arm 329 on its return or backward movement and which is designed only to return the slide 257 to its outward position. It will also be noticed that the can end feed mechanism is thrown into operation by each individual can as it actuates the can-controlled lever and is thrown out of engagement as soon as a can end is fed to the seaming station; and if a can body is not in position to be closed a can end will not be fed to the seaming station.

Located at the top of the frame 1 is a drive gear casing 377. Extending through this casing and journaled in bearings 378 and 379 is a horizontal power shaft 380. This shaft has keyed thereto and within the casing 377 a worm 381 which meshes with and drives a worm gear 382 mounted near the top of the vertical cam shaft 59. Adjacent the worm 281 and also keyed to the power shaft 380 is a beveled gear 383 which meshes with and drives a bevel pinion 384 fixed on the upper end of the vertical shaft 217' of the seaming head drive gear 217. The gear 217 has preferably formed integral therewith a sleeve 385 which is rotatably mounted in the bracket 138'. As previously explained the seaming head casing 131 and the bracket 138' are adjustable vertically. In consequence of this the gear wheel 217 and its sleeve 385 are designed to slide vertically on the shaft 217' by means of a feather key 386 (Fig. 3). From this it will be seen that as the casing 131 and bracket 138' are moved the gear 217 will slide vertically on the shaft 217' and always be able to receive power therefrom.

In order that there may be no danger of breakage or damage of any of the numerous parts operated by the cam shaft 59, because of anything becoming jammed in the mechanism, there is provided at the upper extremity of the vertical drive shaft 59 a yieldable friction driving safety slip device, which will give if anything should arrest the proper operation of the machine.

The worm gear 382 is rotatably mounted upon a sleeve 387 keyed to the vertical cam shaft 59. The lower end of this sleeve is provided with an annular collar 388 upon which the worm gear 382 rests. In the upper face of the worm gear is an annular depression 389 in which is secured a case hardened steel ring 390. Above the worm gear and vertically slidably mounted upon the sleeve 387 by means of a feather key 391 is an outer sleeve 392. This second sleeve is also provided at its lower end with an annular collar 393 which bears upon the ring 390 in the worm gear 382. The ring 390 is provided in its upper face with two beveled notches 394 located off center or non-diametrically and adapted to receive and normally retain two case hardened steel beveled blocks 395 (Fig. 34) secured in recesses designed to receive the same in the lower face of the collar 393 of the sleeve 392. Bearing upon the upper face of the collar 393 is a compression spring 396 which is adjustably held under tension by a lock nut 397 threaded onto the upper end of the inner sleeve 387. The tension of the spring is made sufficient to hold the blocks in the notches for the transmission of power under ordinary conditions. But if any extraordinary tension is caused by something jammed in the mechanisms driven by the cam shaft 59, the worm gear 382 will continue to rotate but will force the beveled blocks 395 up against the pressure of the spring and out of engagement with the notches 394. The blocks 395 will then rest upon the smooth surface of the ring 390 as it rotates until the notches 394 make a complete revolution and again register with the blocks 395, and, if the obstruction is still in the machine, will again force the blocks out of engagement without rotating the drive shaft 59. This will continue until the obstruction or undue tension is removed, and then when the notches and blocks again register they will clutch and rotate as a unit. The tension required to operate the machine under normal conditions is regulated by the nut 397 on the inner sleeve 387, which may be loosened or tightened to lessen or increase the pressure of the spring.

The two beveled blocks 395 and the corresponding notches 394 are located off the diametrical center line. This particular construction is desirable to insure a complete revolution of the worm gear 382 before they can again engage. Were it not for this they would interclutch when they had made but one half of a revolution with increased number of shocks, and might throw the various mechanisms out of time.

In timing the machine or adjusting the seaming rolls it is necessary that the mechanism may be operated slowly by hand with the power turned off. And it is highly desirable that the power mechanism be so automatically independent of the hand actuating mechanism that an operative cannot be injured by the latter (if he should have hold of it) when the power mechanism is re-connected. To this end the hand mechanism is automatically disconnected and rendered totally inoperative when the power mechanism is active, and vice versa. To provide for this there is slidably mounted in a bearing 398, preferably formed integral with the gear casing 377, a horizontal forwardly extending shaft 399. This shaft carries at its forward end a hand wheel 400 and at its rear extremity has fixed thereon a pinion 401 which may mesh with a gear wheel 402 keyed to the horizontal power shaft 380. Pivoted upon a supporting bearing 403, secured to the gear casing 377 and opposite the shaft 399, is a clutch operating hand lever 404. This lever extends forwardly and has pivoted thereto as at 405 one end of a link 406. The link 406 extends across the front of the machine and has its other end pivotally connected as at 407 to one arm 408 of a bell crank lever 409. This bell crank is mounted so as to swing in a plane above that of the shaft 399, upon a supporting bearing 410 also on the gear casing 377. The arm 411 of this bell crank 409, overhangs the shaft 399 and is provided with a downwardly projecting lug 412 which engages behind a collar 413 secured to the said shaft. The main power clutch 413' through which the machine is driven connects the shaft 380 with the belt or power wheel 419 and is thrown into and out of operation by a pivoted shifter fork or yoke 414 on the end of a yoke lever 415. This lever is pivotally connected as at 416 to one end of a link 417 which extends forwardly along the side of the gear casing 377 and has its forward end pivoted to the clutch operating lever 404 at the same point where the link 406 is connected.

It will be seen that by moving the clutch operating lever 404 outwardly about its pivot or bearing 403 it will force the link 417 rearwardly, as shown in dotted lines in Fig. 27, thereby swinging the yoke lever 415 about its pivot 416 to release the clutch spring 418 and allowing the same to bring enough pressure to bear upon the otherwise freely revolving power drive pulley 419 to engage the same frictionally with disks keyed to the shaft and transmit the power to the latter. When the clutch lever 404 is so swung outwardly to apply the power to the machine it swings the bell crank lever 409 about its pivot through the medium of the connecting link 406. This will cause the downwardly projecting lug 412 on the arm 411 of the said bell crank to engage the collar 413 on the shaft 399 and to slide the said shaft forwardly in its bearing 398, disengaging as it does so the pinion 401 from the gear wheel 402 of the power shaft 380. When however the clutch lever 404 is again swung to the right, thereby compressing the clutch spring 418 and releasing the clutch, the link 406 will force the bell crank 409 around, disengaging as it does so the lug 412 from the collar 413 on the hand shaft 399, and allow the same to be slid inwardly, thereby permitting the pinion 401 to engage the gear wheel 402, if it is desired to manually operate the machine.

In order that the machine may be easily assembled or disassembled, the vertical cam shaft 59 is formed of two parts joined by a coupling 420.

For convenience the principal sub-mechanisms and their actuating means may be briefly recapitulated: The topping device is driven by the feed chain 52, through the train of gearing shown in Fig. 23; the can feeding chain is driven by the chain 57 from the cam shaft 59; the can lifter 84 is raised by the cam 103 on said cam shaft; the can end feed slide is reciprocated by the eccentric 348 on the cam shaft, the operation of the slide being controlled by the lever 370 in the path of the cans; the marker is operated by the cam 317 on the lower end of the feed chain shaft 55, the latter being driven from the cam shaft 59; the seaming head is rotated by the hollow shaft 210 and train of gearing shown in Figs. 24 and 30, driven by the horizontal power shaft 380; the seaming roll cams are vertically reciprocated by the cam 208 on said cam shaft; the knock out rod is vertically reciprocated by the two motion cam 245 on said cam shaft.

By "seaming head" I include various can end attaching means. Such means may be a clincher which crimps the head loosely on to a can, all around the circumference or in spots. Also, when the seaming head is used, only the first operation or curling roll may be put in operation, the complete hermetic seaming by the second operation being done by any suitable means after processing the filled and partly or loosely closed can; and the words "closing machine" are not limited to a machine which hermetically closes the cans.

What is claimed is:

1. In a seaming head, in combination: a seaming head body; seaming roll carrying members; seaming rolls mounted on said carrying members; means for actuating said rolls; a chuck member cooperating with the said rolls, and arcuate guard members extending in line above the can body from near one seaming point to near the other seaming point and adapted to limit the upward movement of a can body within the seaming head relative to the said seaming rolls and chuck.

2. In a seaming head, in combination: a seaming head body; seaming roll carrying members mounted on said body; seaming rolls mounted on the said carrying members; seaming roll actuating members mounted on the said head body; and a yielding shock absorbing support for said seaming roll carrying members through which abrupt resistance encountered by the seaming rolls is communicated to said body.

3. In a seaming head, in combination: a seaming head body; seaming roll carrying members mounted on said body; seaming rolls mounted on the said carrying members; seaming roll actuating members pivoted on the said head body; and yielding shock absorbing means for the pivot points of said actuating members comprising hollow bearing blocks and yielding backing blocks.

4. In a can seaming machine, in combination: a seaming station; can conveying means leading to and away from said seaming station; a rotary can receiving table; a rotary can carrying and spacing table; a plurality of yieldable can spacing members carried by said table; means whereby said can receiving table is rotated by frictional engagement with the said can carrying table; and means whereby said can carrying table and can conveying means are actuated.

5. In a can seaming machine, in combination: a seaming station; can conveying means whereby the cans are delivered to the seaming station; a rotary can carrying table delivering to the said can conveying means; means for actuating said carrying table; a rotary can receiving table engaging above said carrying table; a friction ring movably connected with said receiving table and engaging under the same; and springs acting to press said ring against the can carrying table.

6. In a can closing machine, the combination of seaming mechanism; a horizontally immovable support for can ends situated beneath the said seaming mechanism, comprising a member having an aperture bounded by taper walls for engaging and rounding up a can body and having a recess for receiving a can end; a movable member for positively placing can ends in said recess, a continuously movable member for advancing open ended can bodies into alignment with said tapered aperture and to convey closed can bodies away from said tapered aperture; together with means for bringing a can body and can end into assembled relation and within the operative zone of said seaming mechanism; whereby the said can end and can body are united.

7. In a can closing machine, the combination of seaming mechanism; a horizontally immovable support for can ends situated beneath the said seaming mechanism, comprising a member having an aperture bounded by taper walls for engaging and rounding up a can body and having a recess for receiving a can end; a movable member for positively placing can ends in said recess, a continuously movable member for advancing open-ended can bodies into alignment with and underneath said tapered aperture, and to convey closed can bodies away from said tapered aperture; together with reciprocating means for bringing a can body and can end into assembled relation and within the operative zone of said seaming mechanism; whereby the said can end and can body are united.

8. In a can closing machine, the combination of seaming mechanism; a horizontally immovable support for can ends situated beneath the said seaming mechanism, comprising a member having an aperture bounded by taper walls for engaging and rounding up a can body and having a recess for receiving a can end; movable members for positively separating and placing can ends in said recess, from a stack of can ends; a continuously movable member for advancing open ended can bodies into alignment with and underneath said tapered aperture and to convey closed can bodies away from said tapered aperture; together with reciprocating means for bringing a can body and can end into assembled relation and within the operative zone of said seaming mechanism; whereby the said can end and can body are united.

9. In a can closing machine, the combination of seaming mechanism; a horizontally immovable support for can ends situated beneath the said seaming mechanism, comprising a member having an aperture bounded by taper walls for engaging and rounding up a can body and having a recess for receiving a can end; a movable member controlled by advancing cans for positively placing can ends in said recess; a continuously movable member for advancing open ended can bodies into alignment with said tapered aperture and to convey closed can bodies away from said tapered aperture; together with means for bringing a can body and can end into assembled relation and within the operative zone of said seaming mechanism; whereby the said can end and can body are united.

10. In a can closing machine, the combination of seaming mechanism; a horizontally immovable support for can ends situated beneath the said seaming mechanism, comprising a member having an aperture bounded by taper walls for engaging and rounding up a can body and having a recess for receiving a can end; a movable member controlled by advancing cans for positively placing can ends in said recess; a continuously movable member for advancing open ended can bodies into alignment with said tapered aperture and to convey closed can bodies away from said tapered aperture; together with reciprocating means for bringing a can body and can end into assembled relation and within the operative zone of said seaming mechanism; whereby the said can end and can body are united.

11. In a can closing machine, the combination of seaming mechanism; a horizontally immovable support for can ends situated beneath the said seaming mechanism, comprising a member having an aperture bounded by taper walls for engaging and rounding up a can body and having a recess for receiving a can end; a movable member controlled by advancing cans for separating and positively placing can ends in said recess from a stack of can ends; a continuously movable member for advancing open ended can bodies into alignment with said tapered aperture and to convey closed can bodies away from said tapered aperture; together with reciprocating means for bringing a can body and can end into assembled relation and within the operative zone of said seaming mechanism; whereby the said can end and can body are united.

12. In a can closing machine, the combination of seaming mechanism; a horizontally immovable support situated beneath the said seaming mechanism and in fixed alignment therewith, comprising a member having an aperture bounded by taper walls for engaging and rounding up a can body and having a recess for receiving a can end; a movable member for positively placing can ends in said recess; a continuously movable conveyor for advancing open ended can bodies into alignment with said tapered aperture and to convey closed can bodies away from said tapered aperture; together with reciprocating means for bringing a can body and can end into assembled relation within said aperture and within the operative zone of said seaming mechanism; whereby the said can end and can body are united.

13. In a can closing machine, the combination of seaming mechanism; a horizontally immovable support situated beneath the said seaming mechanism and in fixed alignment therewith, comprising a member having an aperture bounded by taper walls for engaging and rounding up a can body and having a recess for receiving a can end; a movable member for positively placing can ends in said recess; a continuously movable conveyer for advancing open ended can bodies into alignment with said tapered aperture and to convey closed can bodies away from said tapered aperture; together with reciprocating means for bringing a can body and can end into assembled relation within said aperture and within the operative zone of said seaming mechanism, whereby the said can end and can body are united, and for returning the assembled can body and can end onto said continuously moving conveyer.

14. In a can closing machine, the combination of seaming mechanism; a horizontally immovable support situated beneath the said seaming mechanism and in fixed alignment therewith, comprising a member having an aperture bounded by taper walls for engaging and rounding up a can body and having a recess for receiving a can end; a movable member for positively and successively placing can ends in said recess; a continuously movable conveyor for advancing open ended can bodies in spaced single file into alignment with said tapered aperture and to convey closed can bodies in spaced single file away from said tapered aperture; together with reciprocating means for bringing a can body and can end into assembled relation within said aperture and within the operative zone of said seaming mechanism whereby the said can end and can body are united, without interrupting the continuous advance of the other advancing can bodies.

15. In a can closing machine, the combination of seaming mechanism; a horizontally immovable support situated beneath the said seaming mechanism and in fixed alignment therewith, comprising a member having an aperture bounded by taper walls for engaging and rounding up a can body and having a recess for receiving a can end; a movable member for positively and successively placing can ends in said recess; a continuously movable conveyer for advancing open ended can bodies in spaced single file into alignment with said tapered aperture and to convey closed can bodies in spaced single file away from said tapered aperture; together with reciprocating means for bringing a can body and can end into assembled relation within said aperture and within the operative zone of said seaming mechanism whereby the said can end and can body are united, and replacing the said assembled can body and end onto said continuously moving conveyer spaced ahead of the next advancing can body and without in any manner interrupting the continuous forward movement of the line of spaced can bodies.

In testimony whereof I have affixed my signature hereto.

PAUL W. FLEISCHER.